United States Patent
Smythe et al.

(10) Patent No.: US 10,486,572 B2
(45) Date of Patent: Nov. 26, 2019

(54) PORTABLE, TRAY AND CARRYING CASE APPARATUS

(71) Applicants: James Smythe, Columbia, MD (US); Leah Tillery, Laurel, MD (US)

(72) Inventors: James Smythe, Columbia, MD (US); Leah Tillery, Laurel, MD (US)

( * ) Notice: Subject to any disclaimer, the term of this patent is extended or adjusted under 35 U.S.C. 154(b) by 0 days.

(21) Appl. No.: 15/178,571

(22) Filed: Jun. 10, 2016

(65) Prior Publication Data
US 2017/0354242 A1 Dec. 14, 2017

(51) Int. Cl.
*B60N 3/00* (2006.01)

(52) U.S. Cl.
CPC .................. *B60N 3/002* (2013.01)

(58) Field of Classification Search
CPC ........... A47C 7/70; A47B 83/045; A47B 5/00; A47B 5/06; A47B 31/06; A47B 3/10; B60N 3/001; B60N 3/007
USPC ............... 108/33, 44, 45, 40, 36, 48, 47, 46; 297/153, 160, 145, 139, 135
See application file for complete search history.

(56) References Cited

U.S. PATENT DOCUMENTS

| | | | |
|---|---|---|---|
| 380,218 A * | 3/1888 | Rice ..................... | A47L 33/10 108/33 |
| 2,934,388 A * | 4/1960 | Brown .................. | A45C 9/00 206/19 |
| 3,326,445 A | 6/1967 | Goings | |
| 3,557,916 A * | 1/1971 | Stowell .................. | A45C 9/00 190/11 |
| 3,583,760 A * | 6/1971 | McGregor ............. | A47B 5/006 297/145 |
| 3,632,161 A | 1/1972 | Arfaras et al. | |
| 3,683,825 A * | 8/1972 | Sheldon ................ | A47B 3/00 108/176 |
| 4,174,669 A | 11/1979 | Lalonde | |
| 4,359,004 A | 11/1982 | Chappell | |
| 4,524,701 A | 6/1985 | Chappell | |
| 4,686,355 A * | 8/1987 | Lay ....................... | A61F 5/445 108/33 |
| 4,829,910 A * | 5/1989 | Lirette .................. | A47B 3/00 108/35 |
| 5,255,724 A * | 10/1993 | Butke .................... | B23Q 1/74 108/33 |

(Continued)

FOREIGN PATENT DOCUMENTS

EP 1405758 4/2004
WO WO 2004/033255 4/2004

*Primary Examiner* — Jose V Chen
(74) *Attorney, Agent, or Firm* — Hoang Steve Ngo

(57) ABSTRACT

A portable, tray and carrying case apparatus is disclosed. In an embodiment, the apparatus includes a tray adapted for being placed in at least a working position and a stowed position; a carrying case for storing or stowing the tray when not in use; a support arm secured to the carrying case and adapted for being placed in an elevated position whereby the tray may be placed in the working position; a support arm locking mechanism for locking the support arm in the elevated position relative to the carrying case; and a tray locking and support bracket assembly for locking the tray in the working position relative to the support arm and for providing support to the tray when the tray is in the working position and being used by a user. The portable, tray and carrying case apparatus may further include a handle and/or an apparatus stabilizing structure.

30 Claims, 30 Drawing Sheets

(56) References Cited

U.S. PATENT DOCUMENTS

| | | | |
|---|---|---|---|
| 5,279,488 A | 1/1994 | Fleming | |
| 5,322,021 A * | 6/1994 | Jackson | B60N 3/002 108/44 |
| 5,425,455 A | 6/1995 | Miller et al. | |
| 5,443,018 A * | 8/1995 | Cromwell | B60N 3/004 108/44 |
| 5,562,049 A * | 10/1996 | Hoffman | A47B 17/065 108/94 |
| 5,588,697 A | 12/1996 | Yoshida et al. | |
| 5,730,065 A * | 3/1998 | Smith | B60N 3/002 108/116 |
| 5,971,487 A * | 10/1999 | Passehl | B60N 2/28 108/44 |
| 6,347,590 B1 | 2/2002 | D'Annunzio et al. | |
| 6,520,091 B1 * | 2/2003 | Dettmers | A47B 5/006 108/42 |
| 7,201,439 B2 * | 4/2007 | Schweizer | A47C 7/70 108/38 |
| 7,721,657 B2 * | 5/2010 | Carstensen | A47B 5/006 108/134 |
| 7,798,072 B2 | 9/2010 | Becker et al. | |
| 7,874,614 B2 * | 1/2011 | Figueras Mitjans | A47C 7/70 297/145 |
| 7,963,231 B2 * | 6/2011 | Osborne | A47B 5/006 108/40 |
| 8,205,562 B2 * | 6/2012 | St. Louis | B64D 11/0638 108/38 |
| 8,342,450 B2 * | 1/2013 | Funke | B64D 11/06 244/118.6 |
| 8,695,513 B2 * | 4/2014 | Figueras Mitjans | A47B 5/006 108/115 |
| 8,894,121 B2 | 11/2014 | Eilers et al. | |
| 9,027,486 B1 * | 5/2015 | Berkovitz | B60N 3/002 108/40 |
| 9,883,736 B2 * | 2/2018 | Dashti | A47B 3/10 |
| 2001/0052309 A1 * | 12/2001 | Allen | A47B 5/06 108/33 |
| 2003/0188672 A1 * | 10/2003 | Parent | A47B 5/006 108/134 |
| 2007/0034124 A1 * | 2/2007 | Benson | A47B 5/04 108/134 |
| 2008/0190329 A1 * | 8/2008 | Boyd | A47B 3/04 108/39 |
| 2011/0067606 A1 * | 3/2011 | Sundarrao | A47B 3/00 108/44 |
| 2011/0204183 A1 * | 8/2011 | Chua | A47B 3/08 244/118.6 |
| 2014/0305349 A1 | 10/2014 | Lippert et al. | |
| 2015/0284089 A1 * | 10/2015 | Gow | B64D 11/0605 297/147 |

* cited by examiner

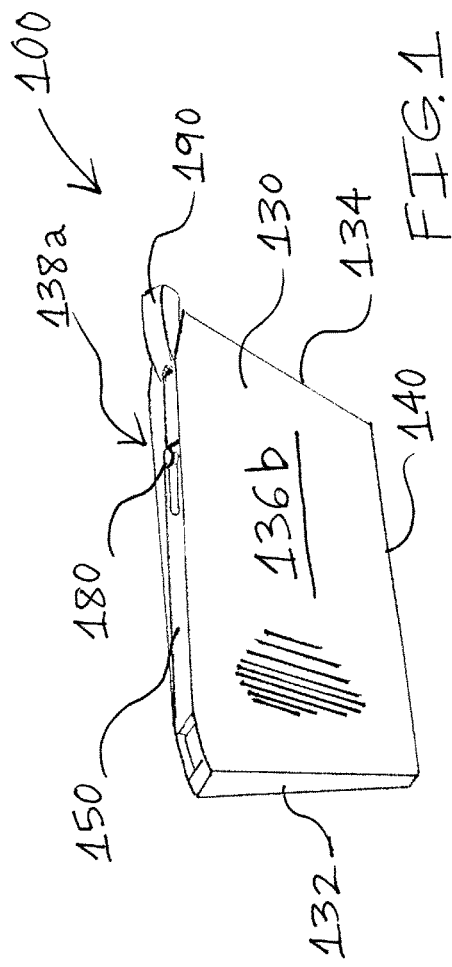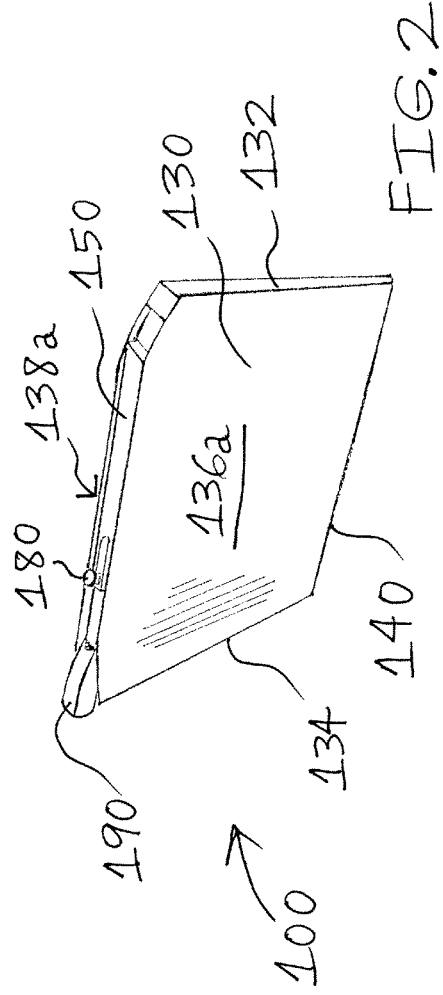

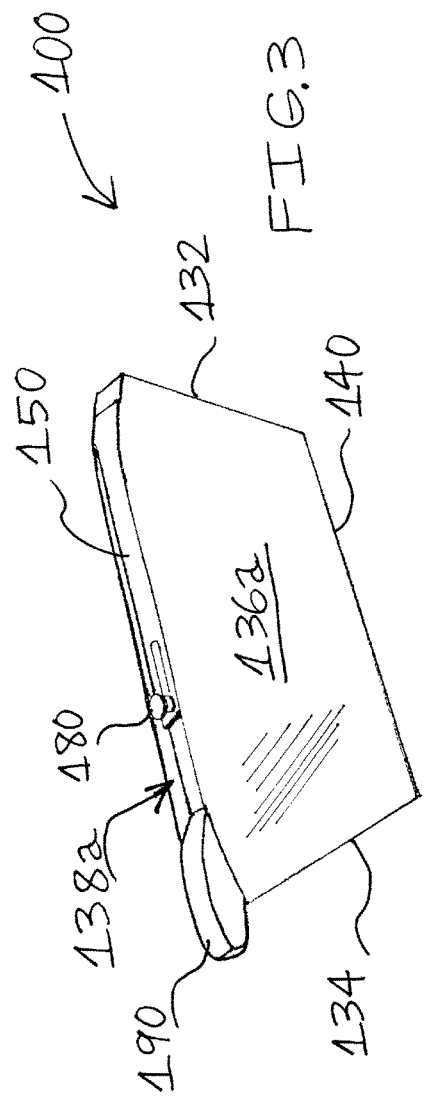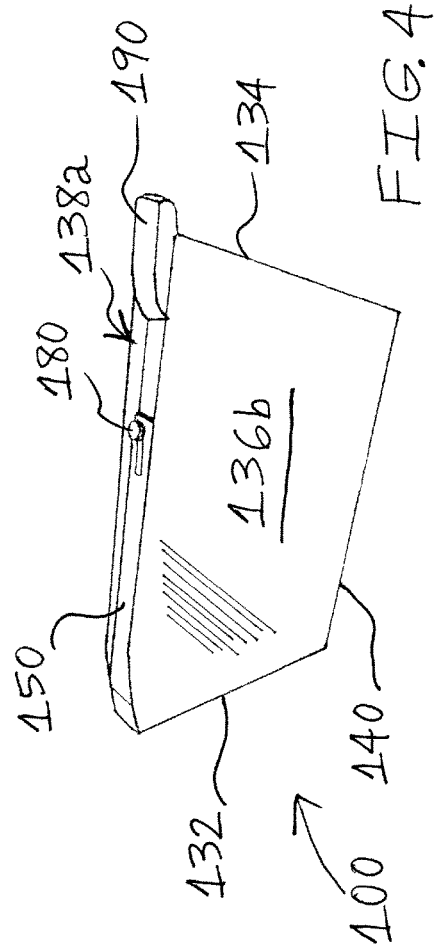

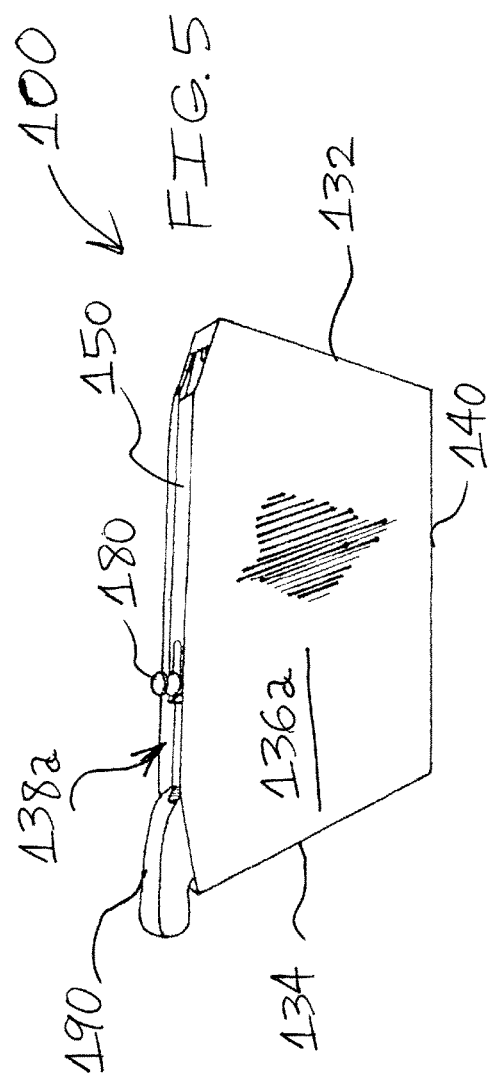
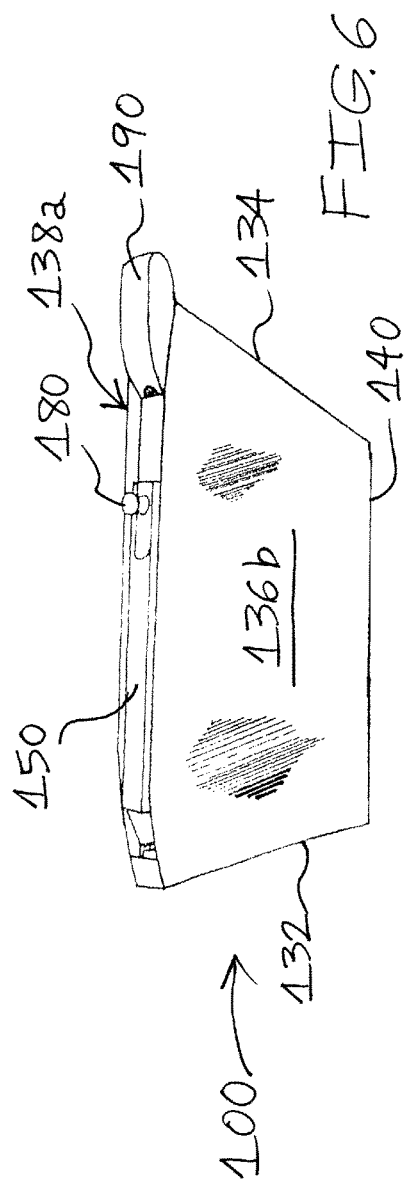

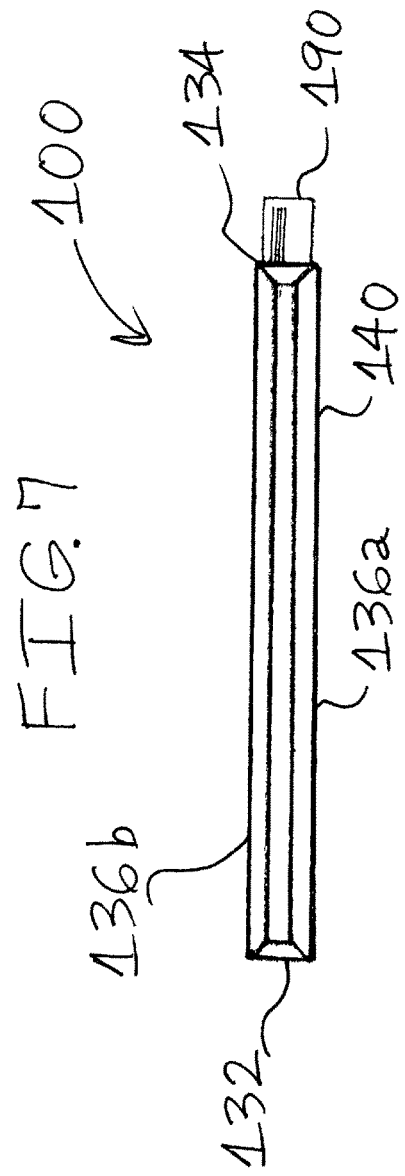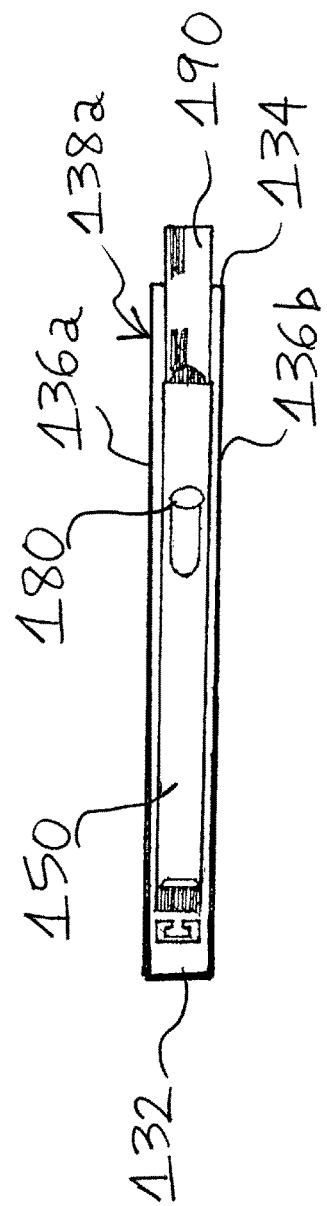

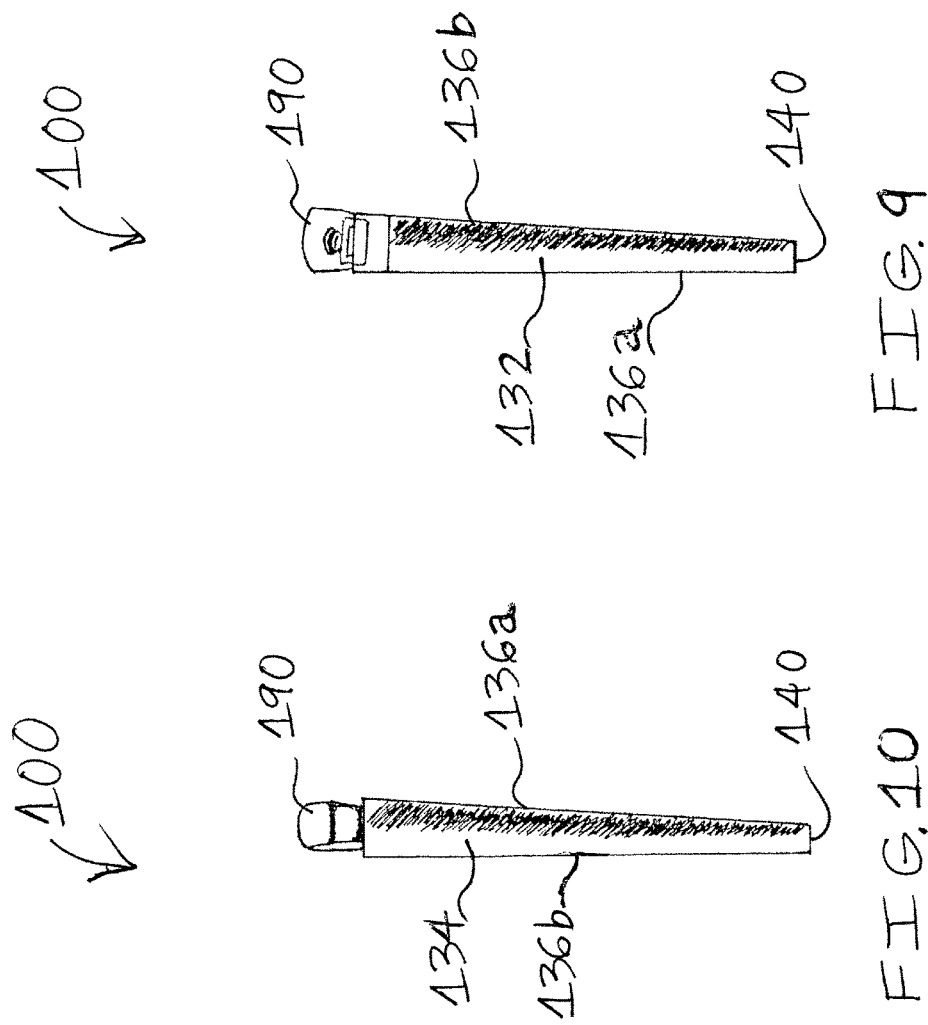

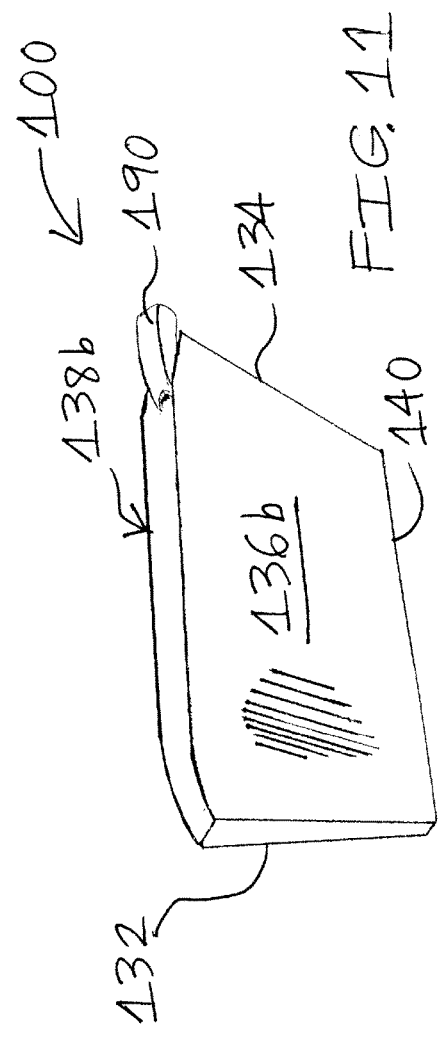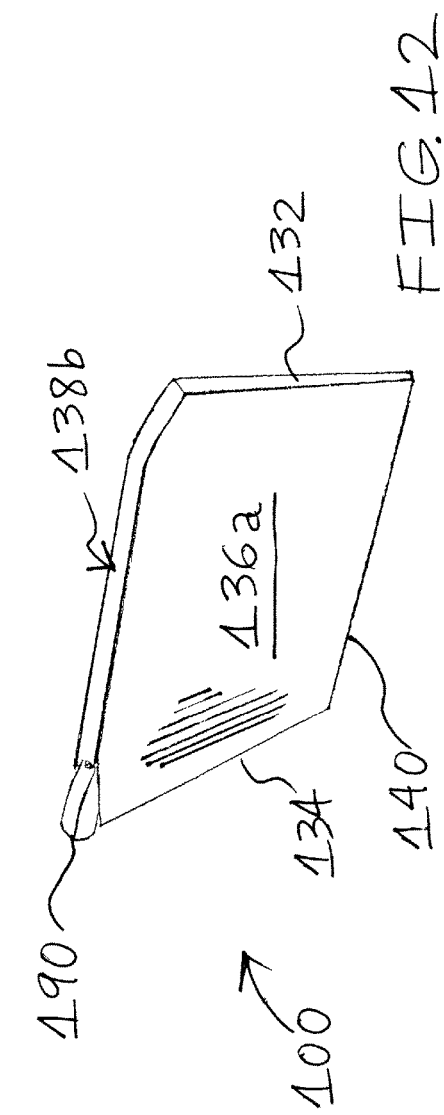

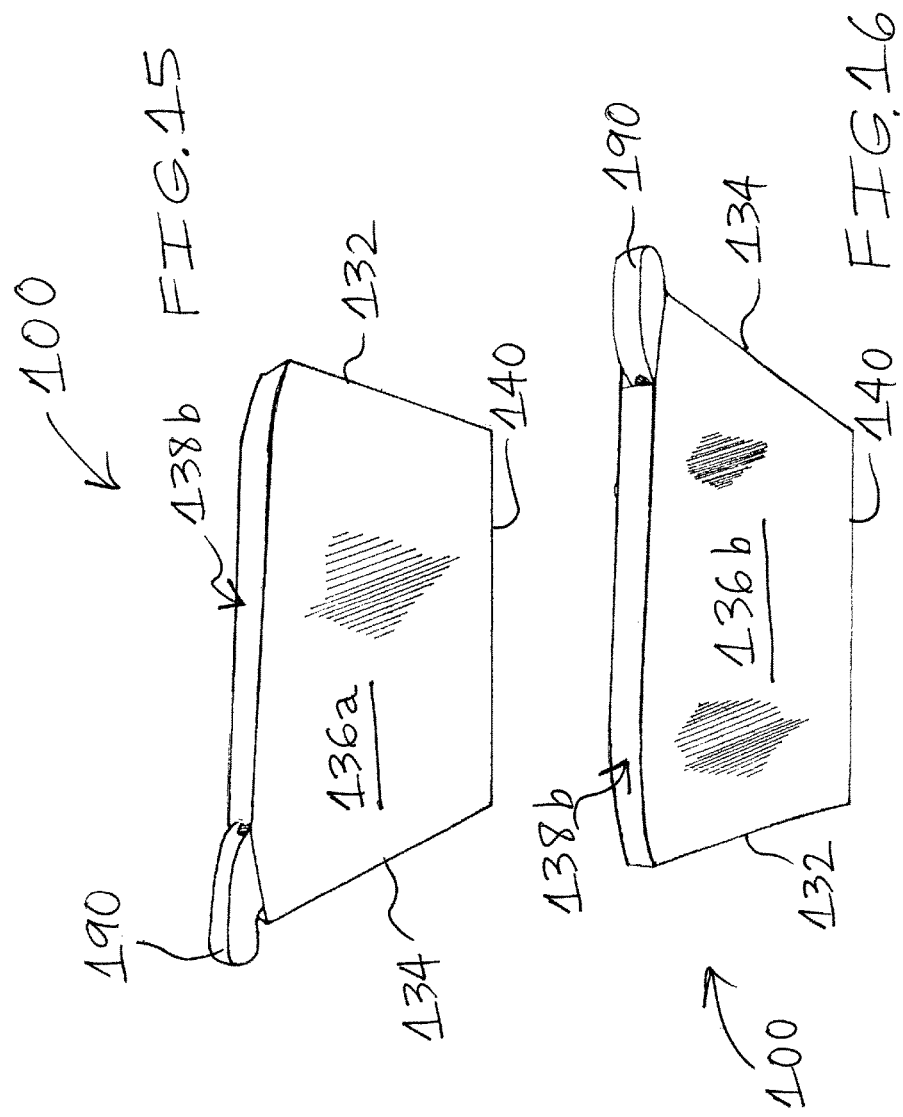

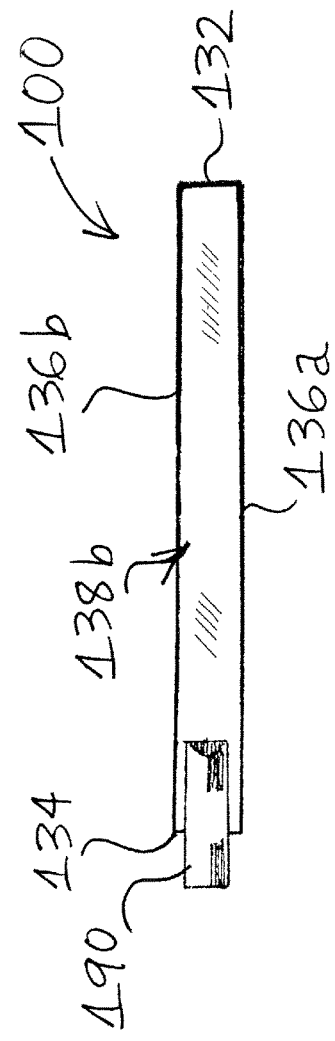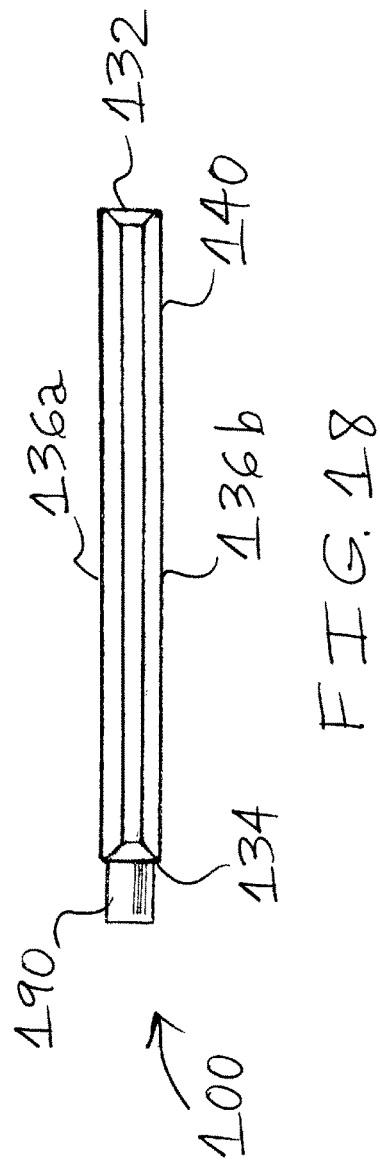

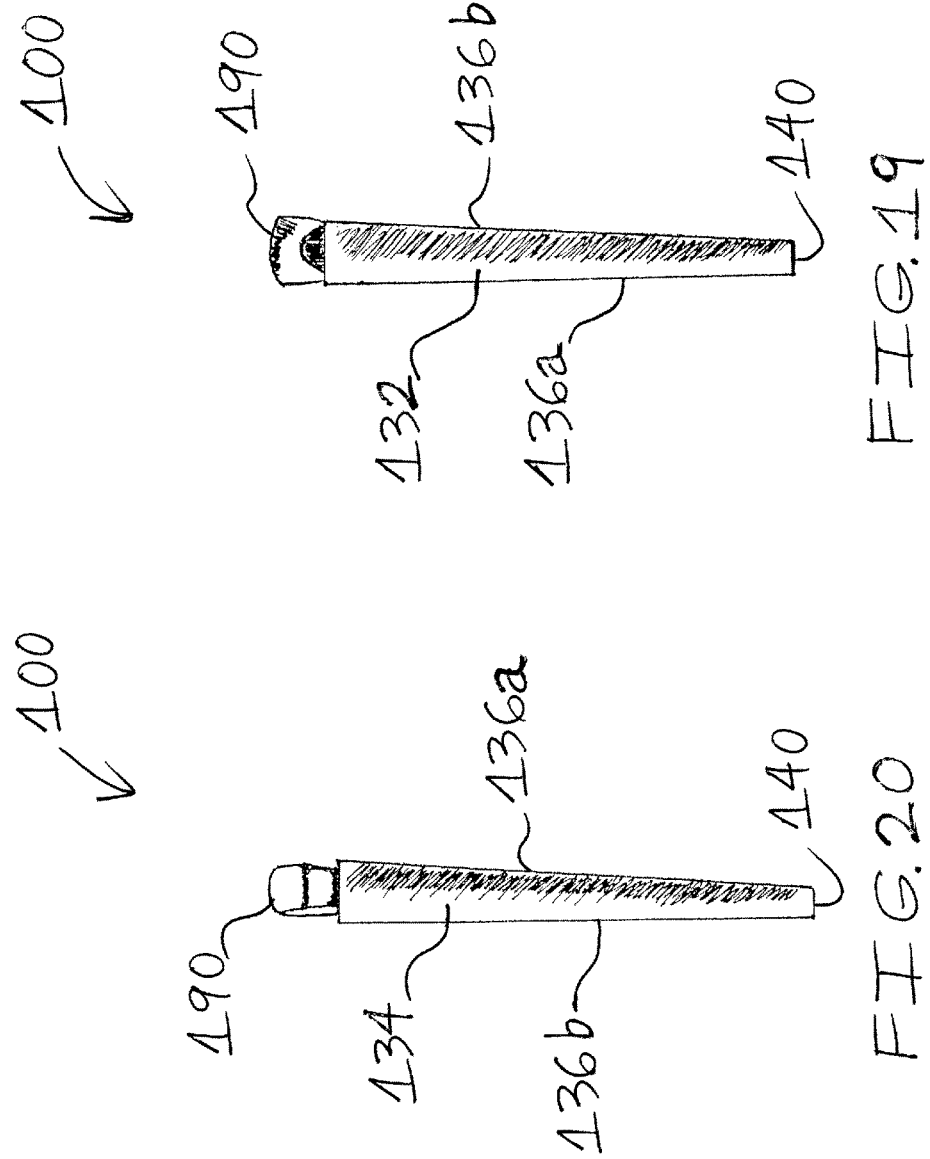

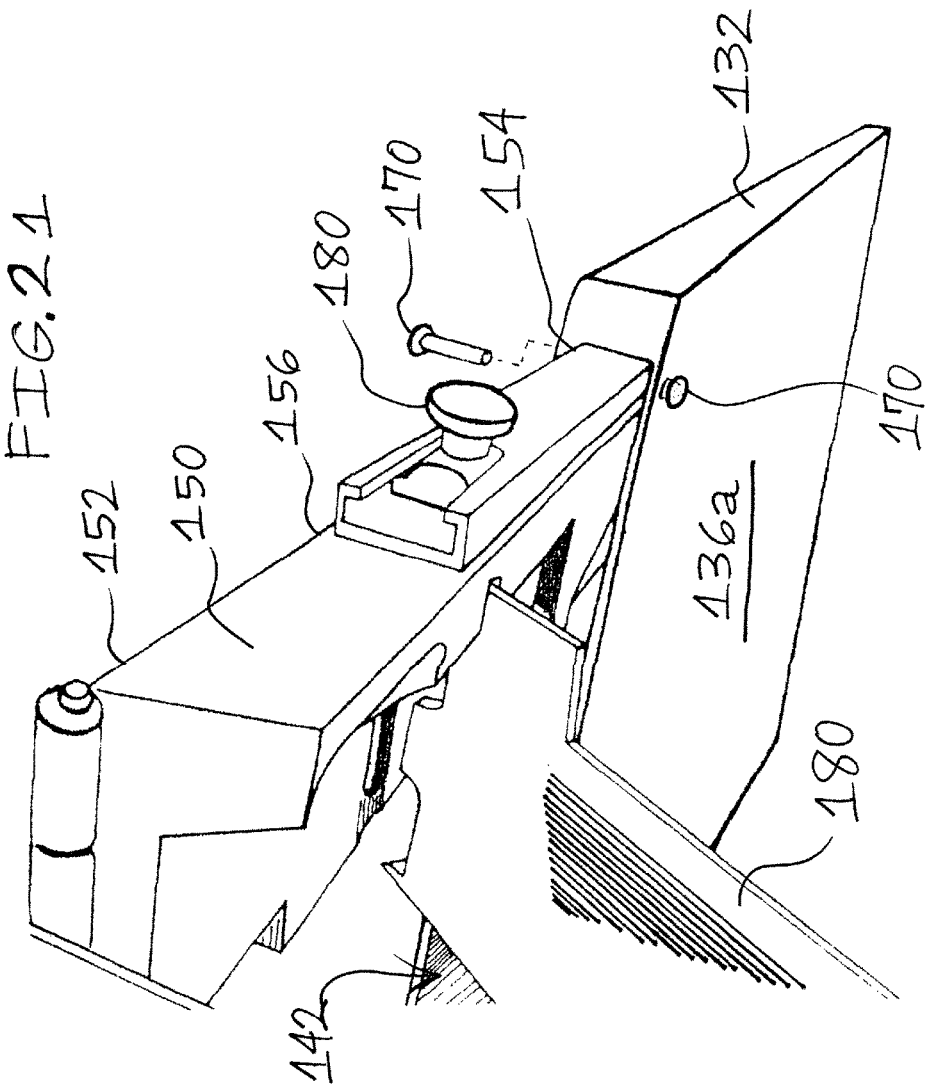

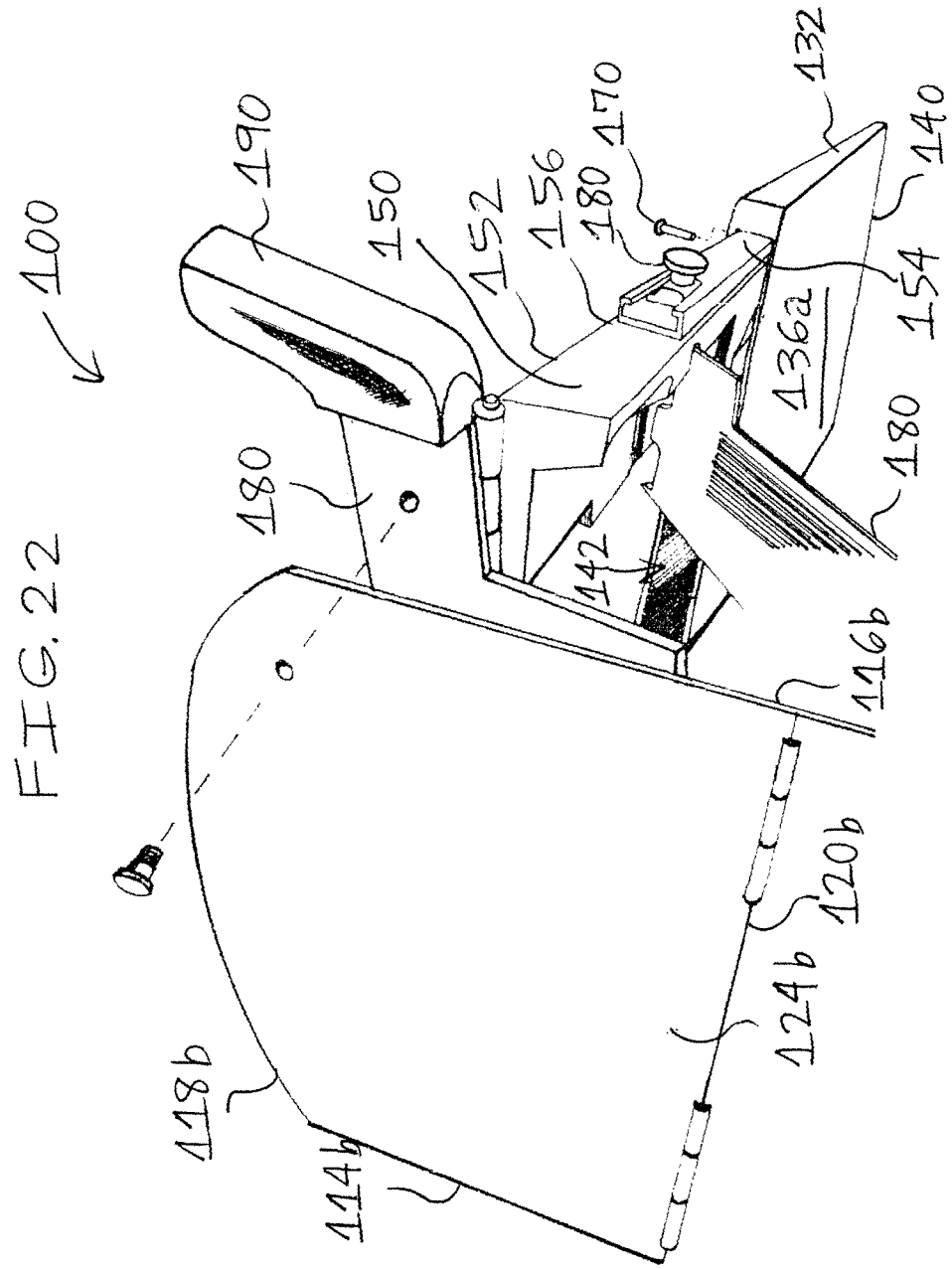

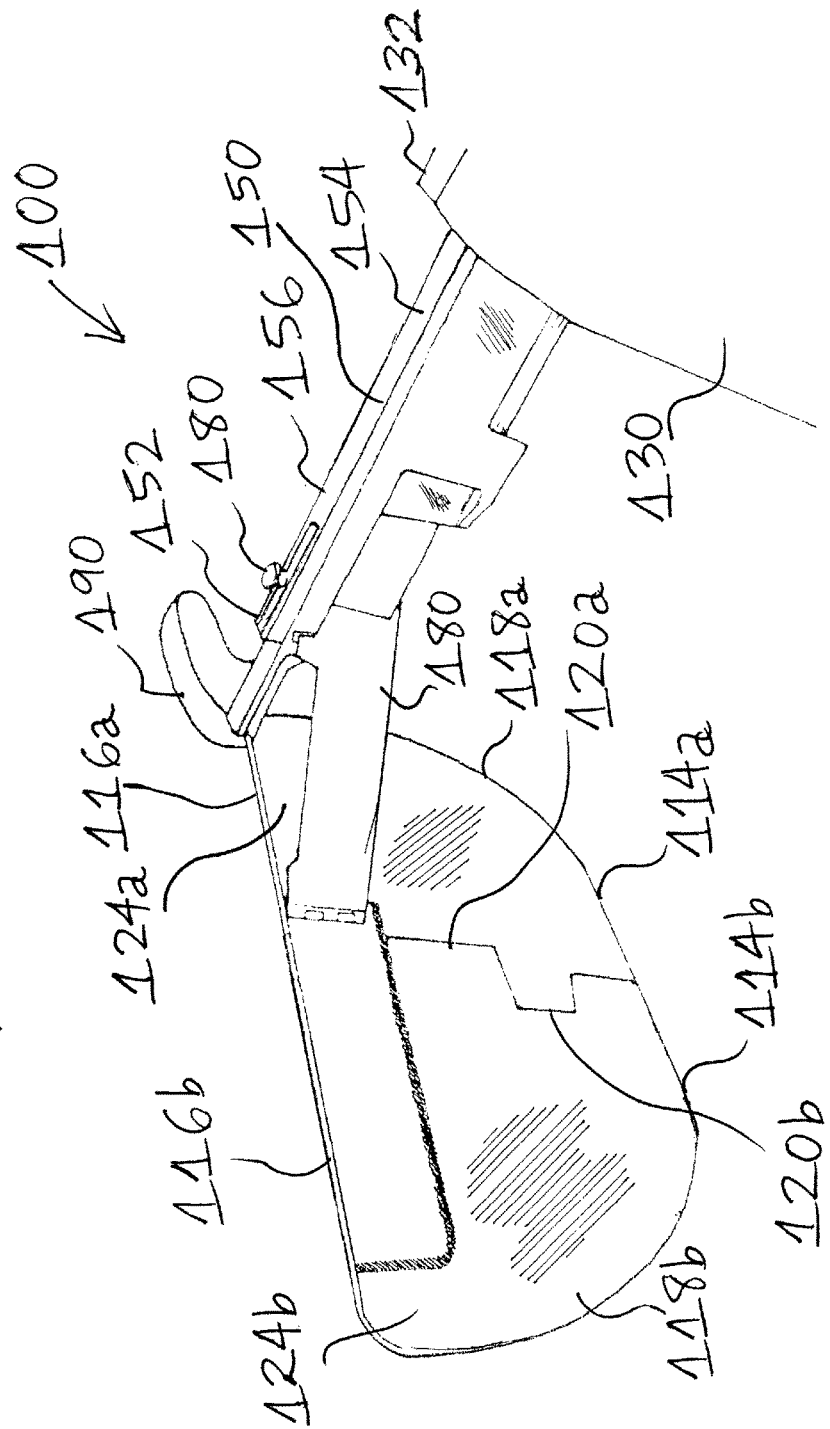

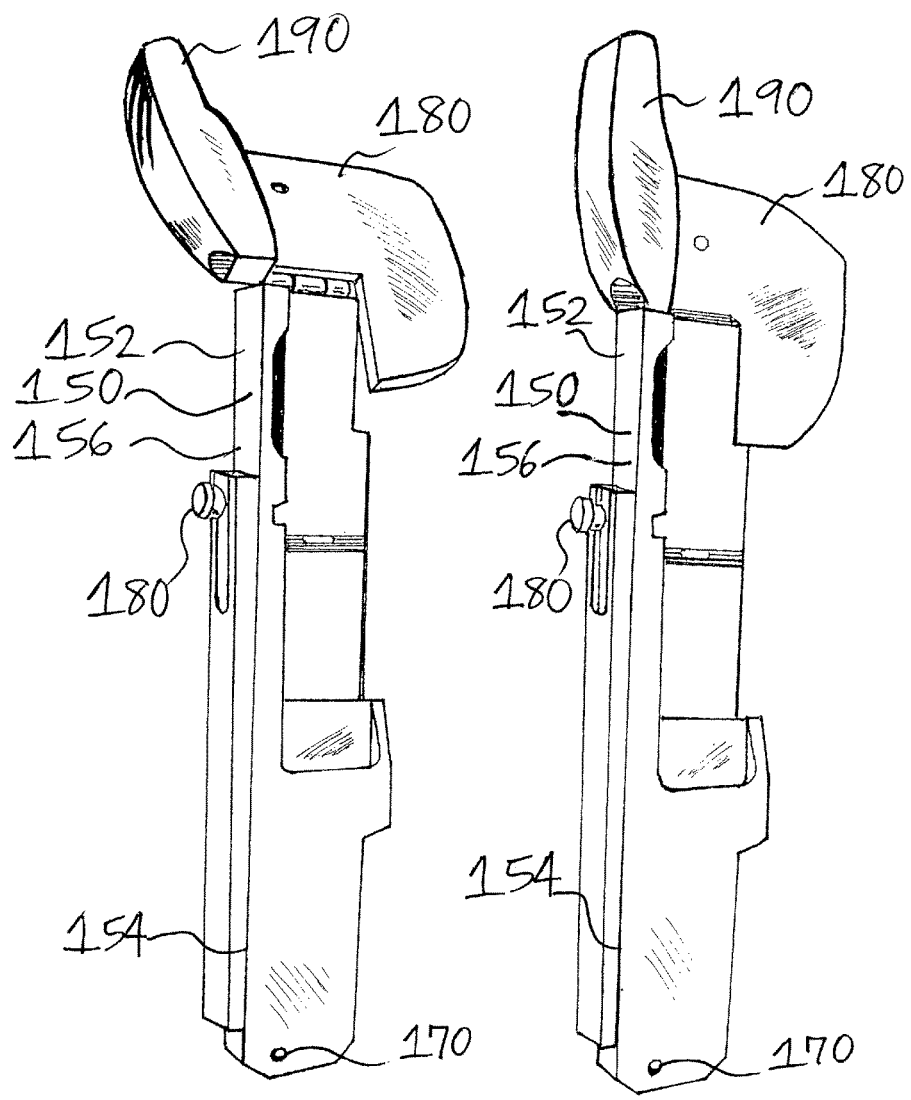

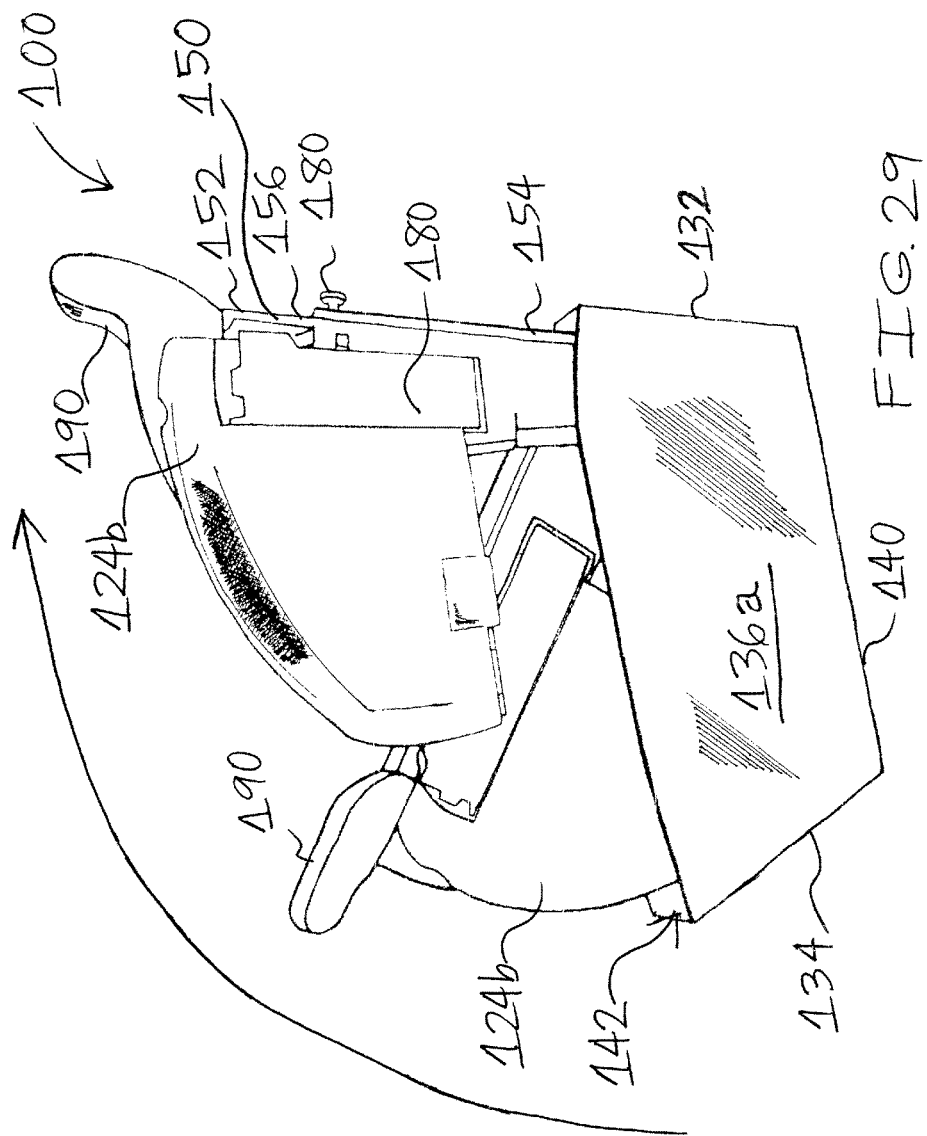

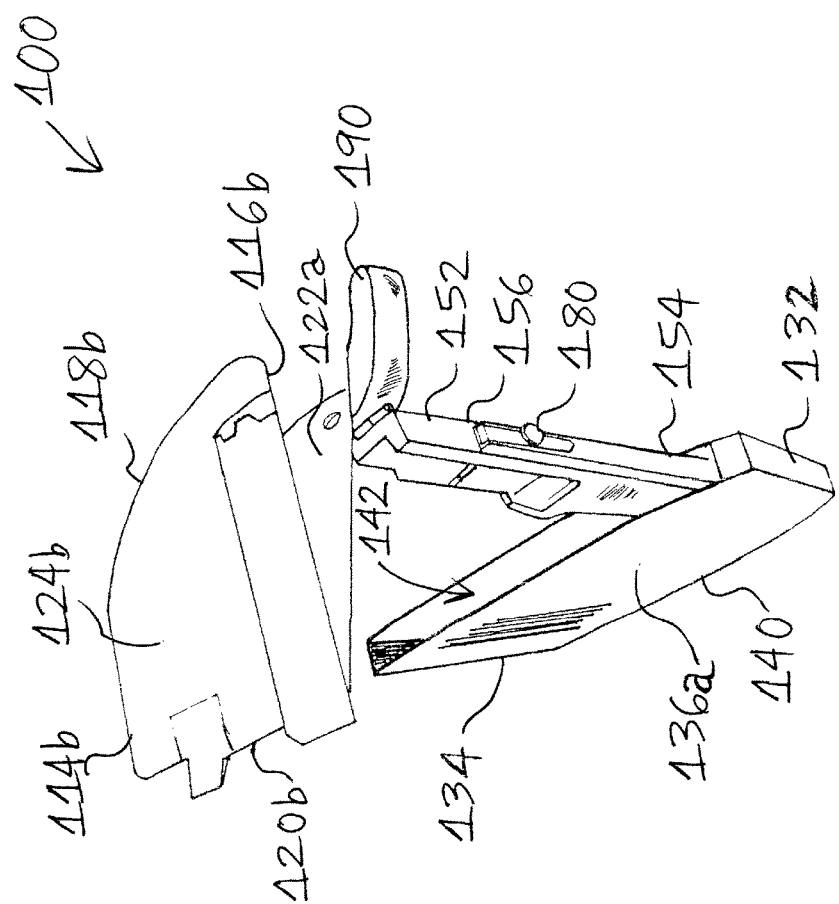

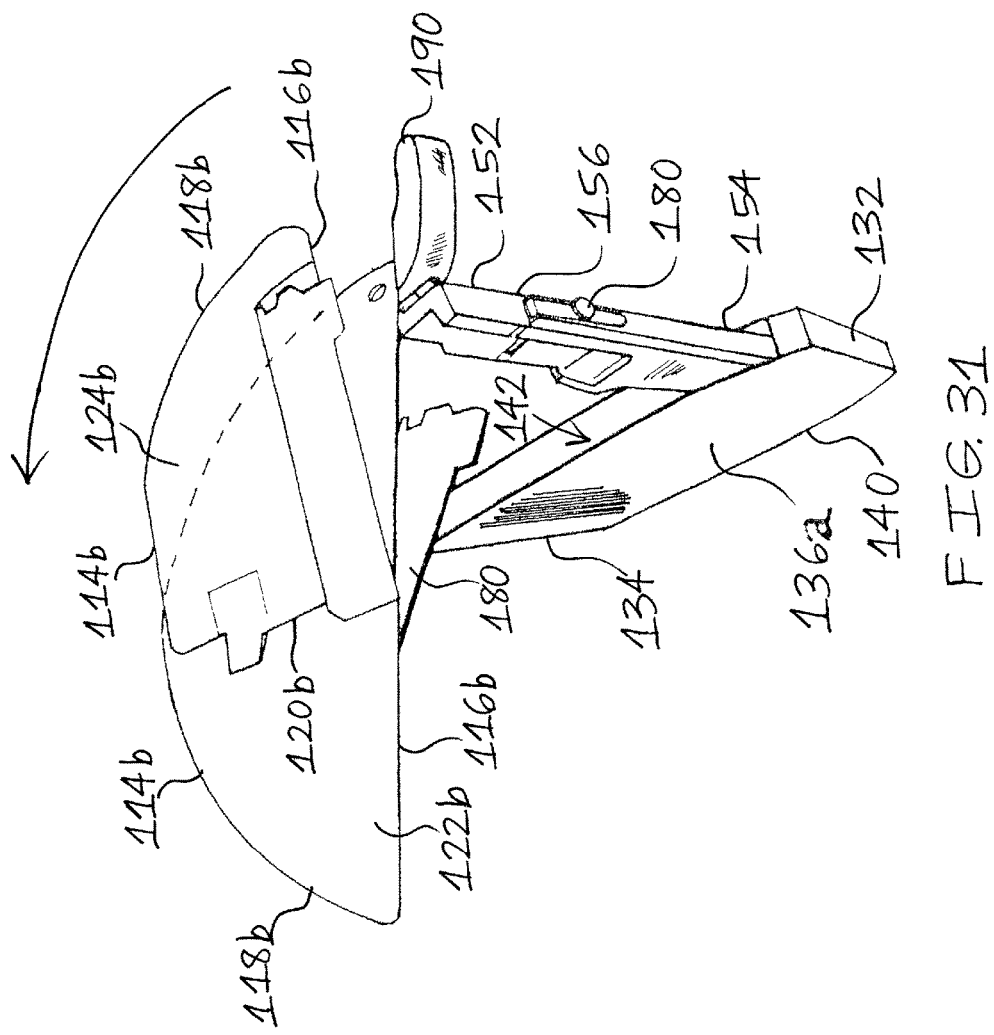

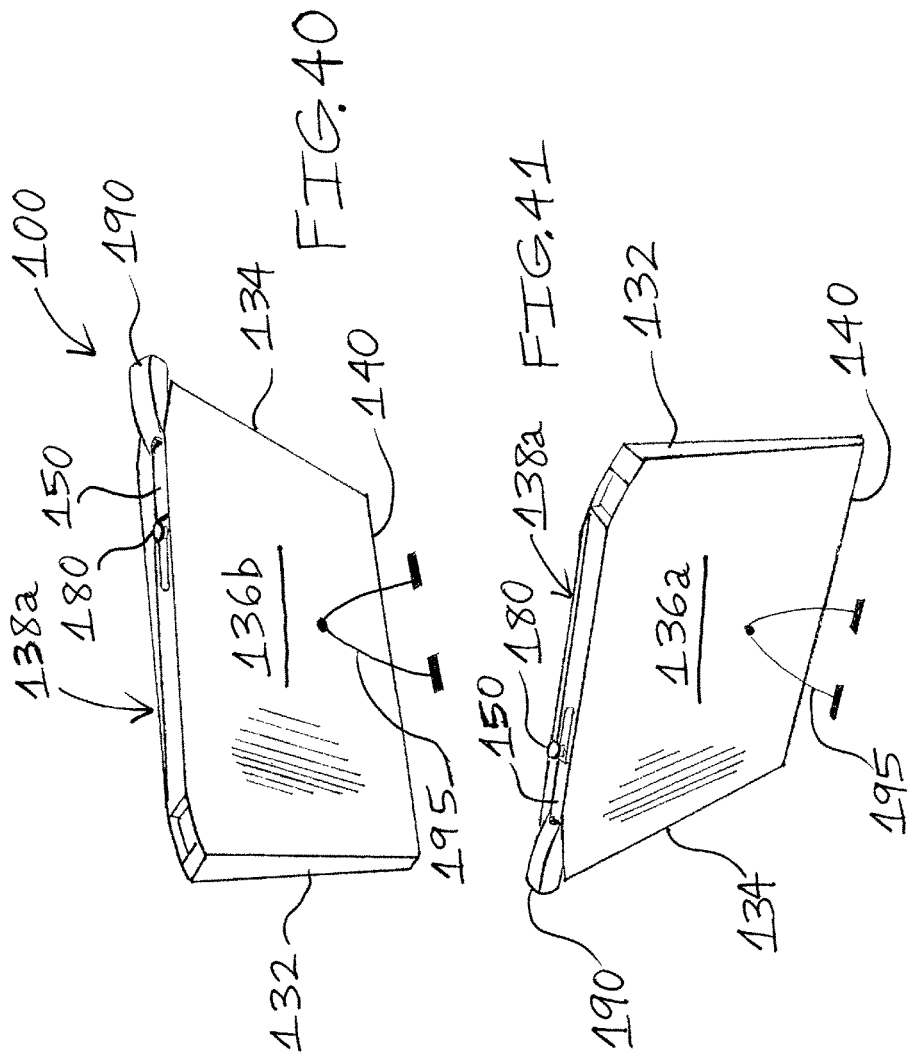

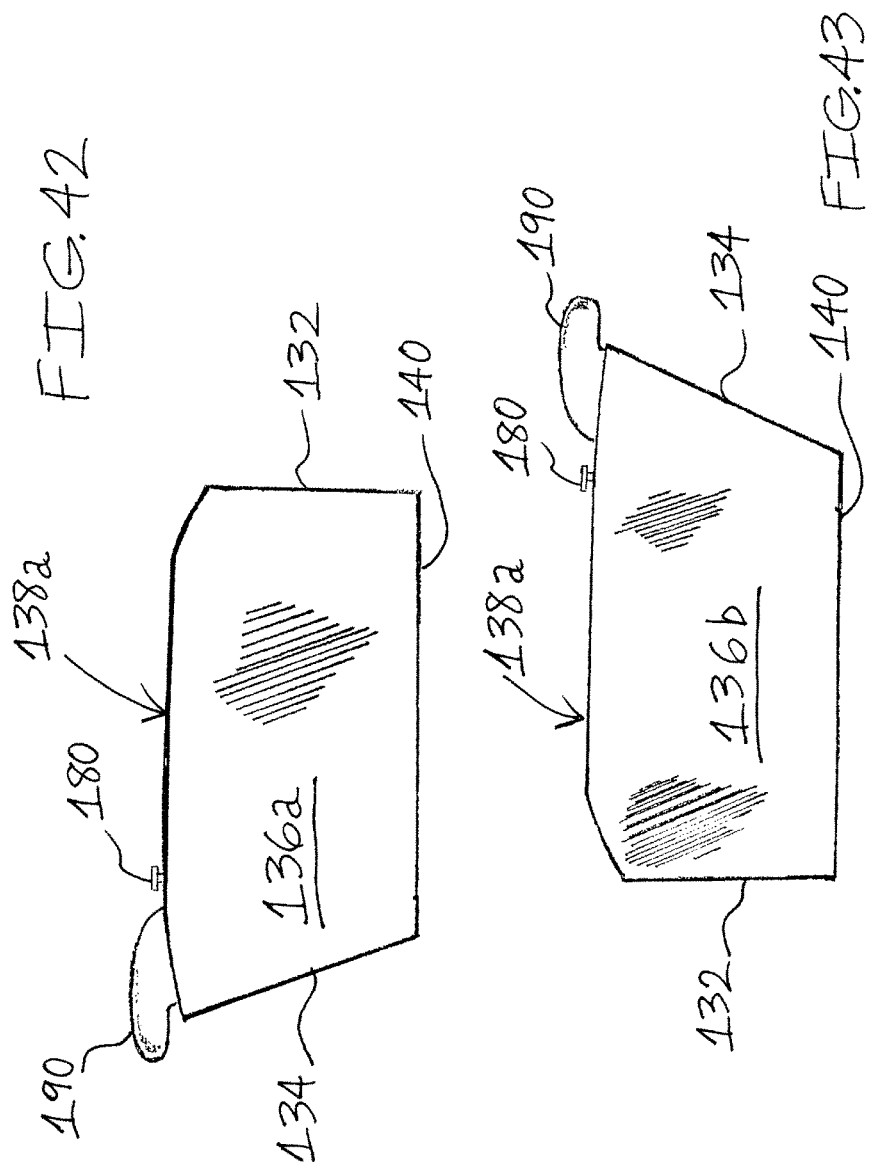

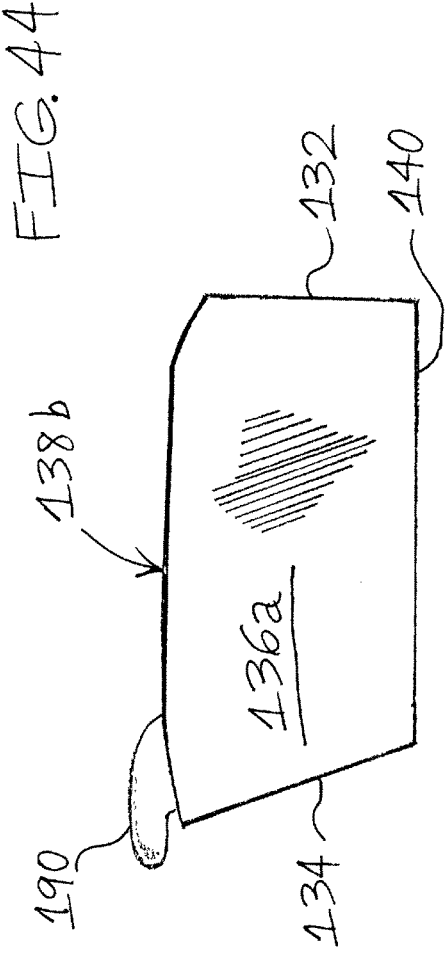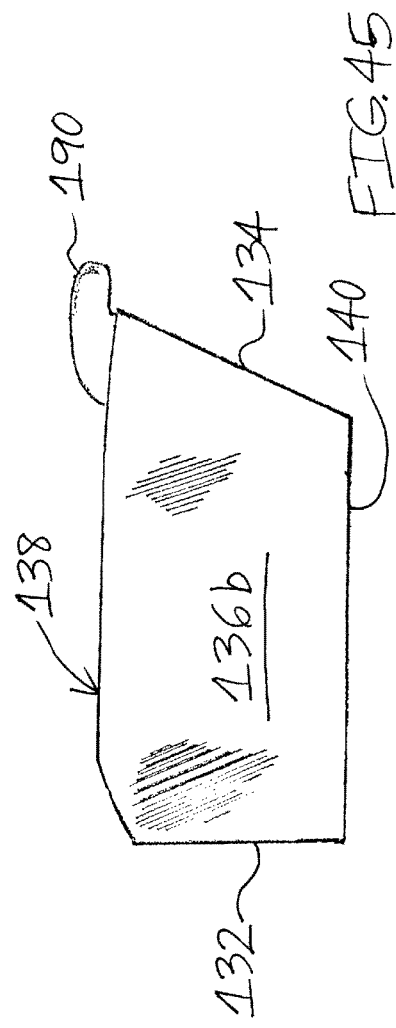

PORTABLE, TRAY AND CARRYING CASE APPARATUS

BACKGROUND OF THE INVENTION

Field of the Invention

The present invention relates generally to trays, fold-out trays, workstations and the like for vehicles and other environments. More specifically, the present invention is a portable, tray and carrying case apparatus that is portable for transport and compact for being stowed and stored away.

Description of the Related Art

Trays, fold-out trays, workstations and the like for vehicles and other environments and settings are known in the art.

Many patents, published patent applications, and/or non-patent publications in the art disclose and/or show trays, fold-out trays, workstations, platforms, etc. for use in vehicles and other environments and settings that are not collapsible or stowable for space-saving storage and/or easy storage, that are not portable for transport, and/or that are not of preferred or desirable size, bulkiness and/or weight.

The present invention overcomes one or more of the shortcomings of the above-described prior art. The portable, tray and carrying case apparatus of the present invention allows a user to quickly and easily place the apparatus into a working position and an alternative stowed position, transport the apparatus, and stow and store away the apparatus into a compact space. The Applicant is unaware of inventions or patents, taken either singly or in combination, which are seen to describe the present invention as claimed.

SUMMARY OF THE INVENTION

The present invention is directed to a portable, tray and carrying case apparatus.

In an embodiment, the portable, tray and carrying case apparatus includes: a tray, preferably a fold-out tray, adapted for being placed in at least a working position and a stowed position; a carrying case, container, shell or housing adapted for storing or stowing the tray when the tray is not in use and adapted for being a portable, transporting device for the tray when the tray is not in use and is desired to be transported; a support arm or bar secured or attached to the carrying case and adapted for being placed in an elevated position whereby the tray may be placed in the working position; a support arm locking member, mechanism or assembly for locking the support arm or bar in the elevated position relative to the carrying case; and a tray locking and support bracket assembly for locking the tray in the working position relative to the support arm or bar and for providing support to the tray when the tray is in the working position and being used by a user. The portable, tray and carrying case apparatus may further include a handle and/or an apparatus stabilizing structure.

An important aspect of the apparatus is that the secured or retained arrangement of the tray and other components within the carrying case allows a user to quickly and easily place the tray into a working position and an alternative stowed position, transport the apparatus, and stow and store away the apparatus into a compact space, while the carrying case provides protection for the tray and other components when the tray is in the stowed position.

BRIEF DESCRIPTION OF THE DRAWINGS

FIG. 1 is a front, left side, perspective view of a portable, tray and carrying case apparatus according to the present invention, wherein a carrying case has an open top and a tray is in a stowed position;

FIG. 2 is a front, right side, perspective view of the portable, tray and carrying case apparatus of FIG. 1;

FIG. 3 is a rear, right side, perspective view of the portable, tray and carrying case apparatus of FIG. 1;

FIG. 4 is a rear, left side, perspective view of the portable, tray and carrying case apparatus of FIG. 1;

FIG. 5 is a right side, perspective view of the portable, tray and carrying case apparatus of FIG. 1;

FIG. 6 is a left side, perspective view of the portable, tray and carrying case apparatus of FIG. 1;

FIG. 7 is a bottom view of the portable, tray and carrying case apparatus of FIG. 1;

FIG. 8 is a top view of the portable, tray and carrying case apparatus of FIG. 1;

FIG. 9 is a front view of the portable, tray and carrying case apparatus of FIG. 1;

FIG. 10 is a rear view of the portable, tray and carrying case apparatus of FIG. 1;

FIG. 11 is a front, left side, perspective view of a portable, tray and carrying case apparatus according to the present invention, wherein a carrying case has a closed top and a tray is in a stowed position;

FIG. 12 is a front, right side, perspective view of the portable, tray and carrying case apparatus of FIG. 11;

FIG. 15 is a right side, perspective view of the portable, tray and carrying case apparatus of FIG. 11;

FIG. 16 is a left side, perspective view of the portable, tray and carrying case apparatus of FIG. 11;

FIG. 17 is a top view of the portable, tray and carrying case apparatus of FIG. 11;

FIG. 18 is a bottom view of the portable, tray and carrying case apparatus of FIG. 11;

FIG. 19 is a front view of the portable, tray and carrying case apparatus of FIG. 11;

FIG. 20 is a rear view of the portable, tray and carrying case apparatus of FIG. 11;

FIG. 21 is a partial, perspective view of a portable, tray and carrying case apparatus according to the present invention, wherein a support arm or bar, a support arm locking member, mechanism or assembly, and a tray locking and support bracket assembly are shown in an assembly mode;

FIG. 22 is a partial, perspective view of a portable, tray and carrying case apparatus according to the present invention, wherein a tray, a support arm or bar, a support arm locking member, mechanism or assembly, a tray locking and support bracket assembly, and a handle are shown in an assembly mode;

FIG. 23 is a perspective view of a portable, tray and carrying case apparatus according to the present invention, wherein a fold-out tray is in a working position and a support arm or bar is in an extended position;

FIG. 27 is a left side, perspective assembly view of a support arm or bar, a tray locking and support bracket assembly, and a handle, wherein the handle is in the first position;

FIG. 28 is a left side, perspective assembly view of a support arm or bar, a tray locking and support bracket assembly, and a handle, wherein the handle is in the second position;

FIG. 29 is a right side, perspective view of a portable, tray and carrying case apparatus according to the present invention, wherein the fold-out tray is being moved from a stowed position toward a working position;

FIG. 30 is a right side, rear perspective view of a portable, tray and carrying case apparatus according to the present invention, wherein the fold-out tray is in a partially folded position and the support arm or bar is in an extended position;

FIG. 31 is a right side, perspective view of a portable, tray and carrying case apparatus according to the present invention, wherein the fold-out tray is being moved from a partially folded position to an unfolded, working positon and the support arm or bar is in an extended position;

FIG. 40 is a front, left side, perspective view of a portable, tray and carrying case apparatus according to the present invention, wherein a carrying case has an open top and includes an apparatus stabilizing structure, and a tray is in a stowed position;

FIG. 41 is a front, right side, perspective view of the portable, tray and carrying case apparatus of FIG. 40;

FIG. 42 is a right side view of the portable, tray and carrying case apparatus of FIG. 1;

FIG. 43 is a left side view of the portable, tray and carrying case apparatus of FIG. 1;

FIG. 44 is a right side view of the portable, tray and carrying case apparatus of FIG. 11; and FIG. 45 is a left side view of the portable, tray and carrying case apparatus of FIG. 11.

It should be understood that the above-attached figures are not intended to limit the scope of the present invention in any way.

DETAILED DESCRIPTION OF THE PREFERRED EMBODIMENTS

The present invention is a portable, tray and carrying case apparatus 100 that may be used in various indoor and outdoor environments and settings, such as, but not limited to, inside vehicles, aircrafts, theaters, or homes, or at tailgating activities or events, where a temporary tray, platform, or workstation is desired or needed. When not desired nor needed, the apparatus 100 can be stowed, stored away, and/or transported quickly, easily and compactly without having the need to deal with a bulky and/or heavy device. As a non-limiting example, the apparatus 100 may be positioned between two stable or stationary walls or structures of sufficient size, such as a center console and a front seat (on either the driver side or passenger side) of a vehicle VEH or automobile, or two rocks, large books, boxes, boulders, tent stakes, or poles. As another non-limiting example, the apparatus 100 may be positioned adjacent to or leaned against one stable or stationary wall or structure of sufficient size. As a further non-limiting example, the apparatus 100 may be secured to a stable or stationary structure, such as a folding canvas chair with arms, a wheel chair, or other enclosed seating area.

Figure 13:
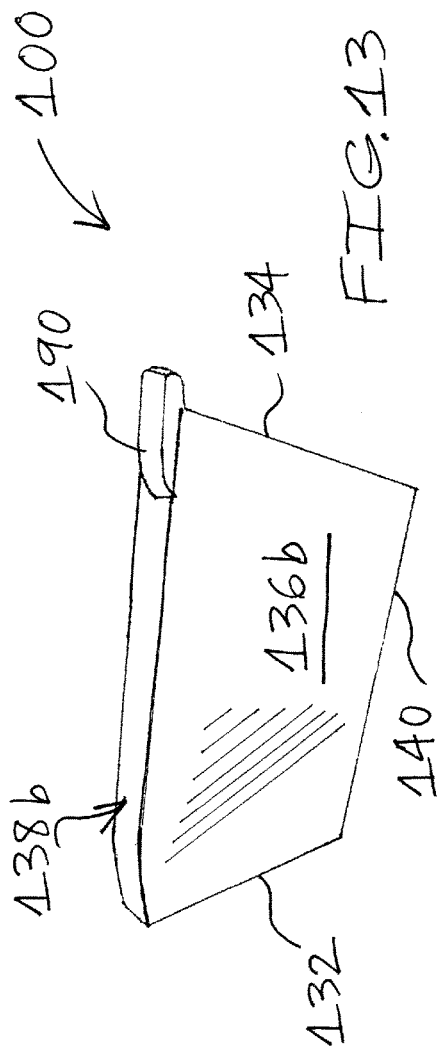
FIG. 13 is a rear, left side, perspective view of the portable, tray and carrying case apparatus of FIG. 11.
Figure 14:
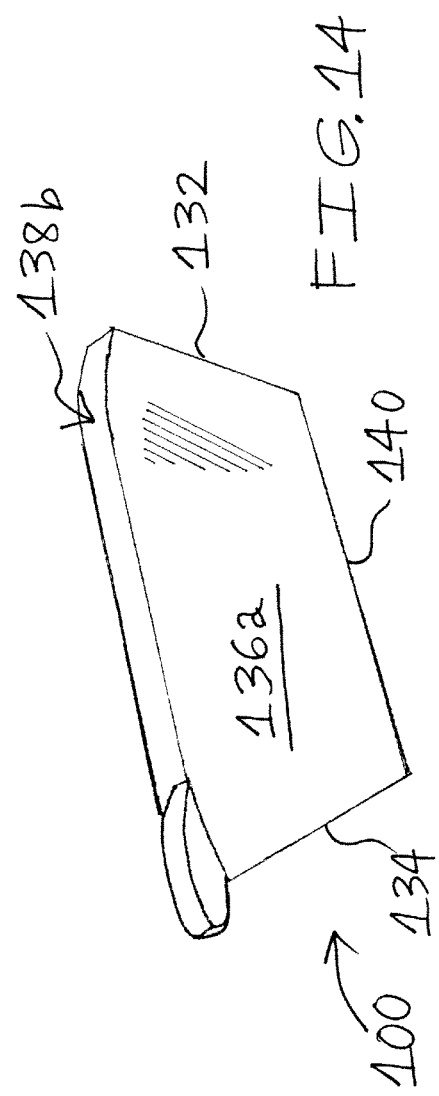
FIG. 14 is a rear, right side, perspective view of the portable, tray and carrying case apparatus of FIG. 11.
Figure 32:
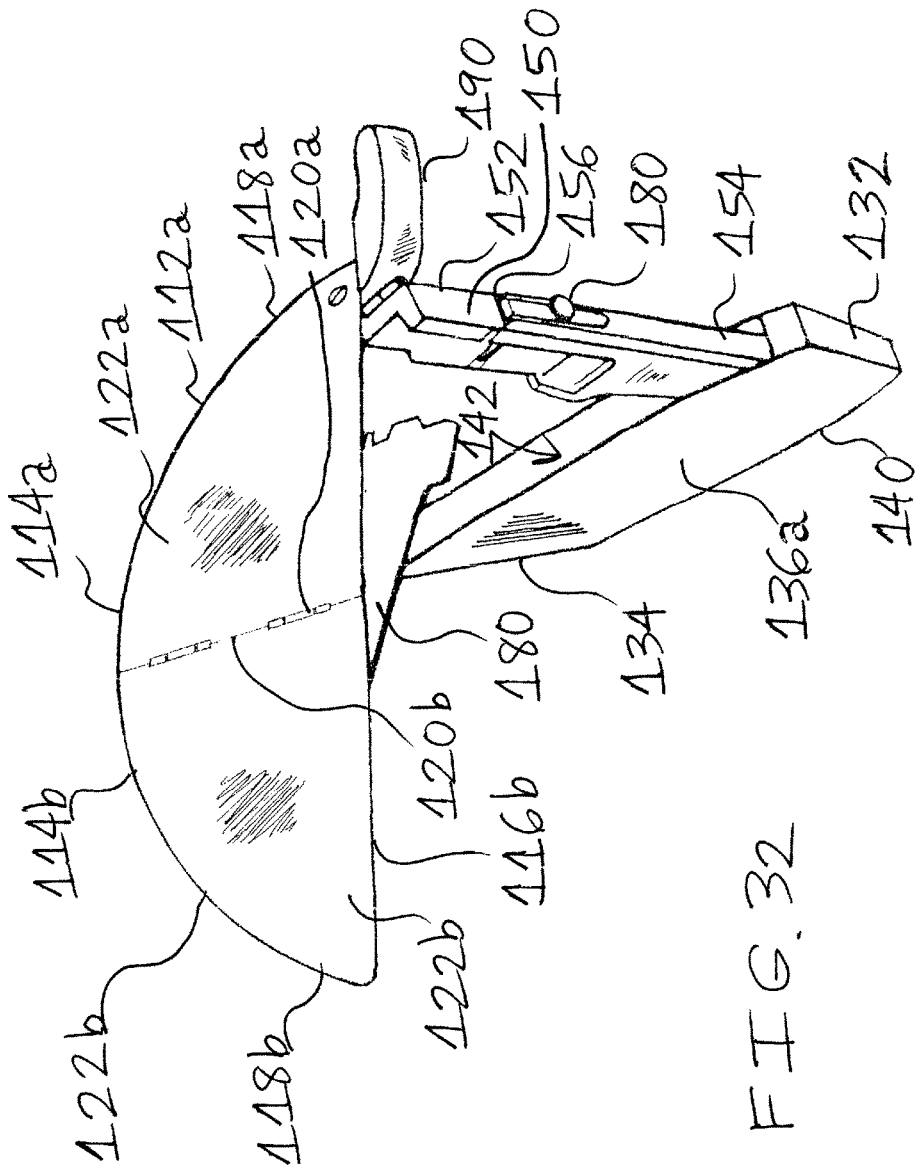
FIG. 32 is a right side, perspective view of a portable, tray and carrying case apparatus according to the present invention, wherein the fold-out tray is substantially in an unfolded, working positon and the support arm or bar is in an extended position.
Figure 35:
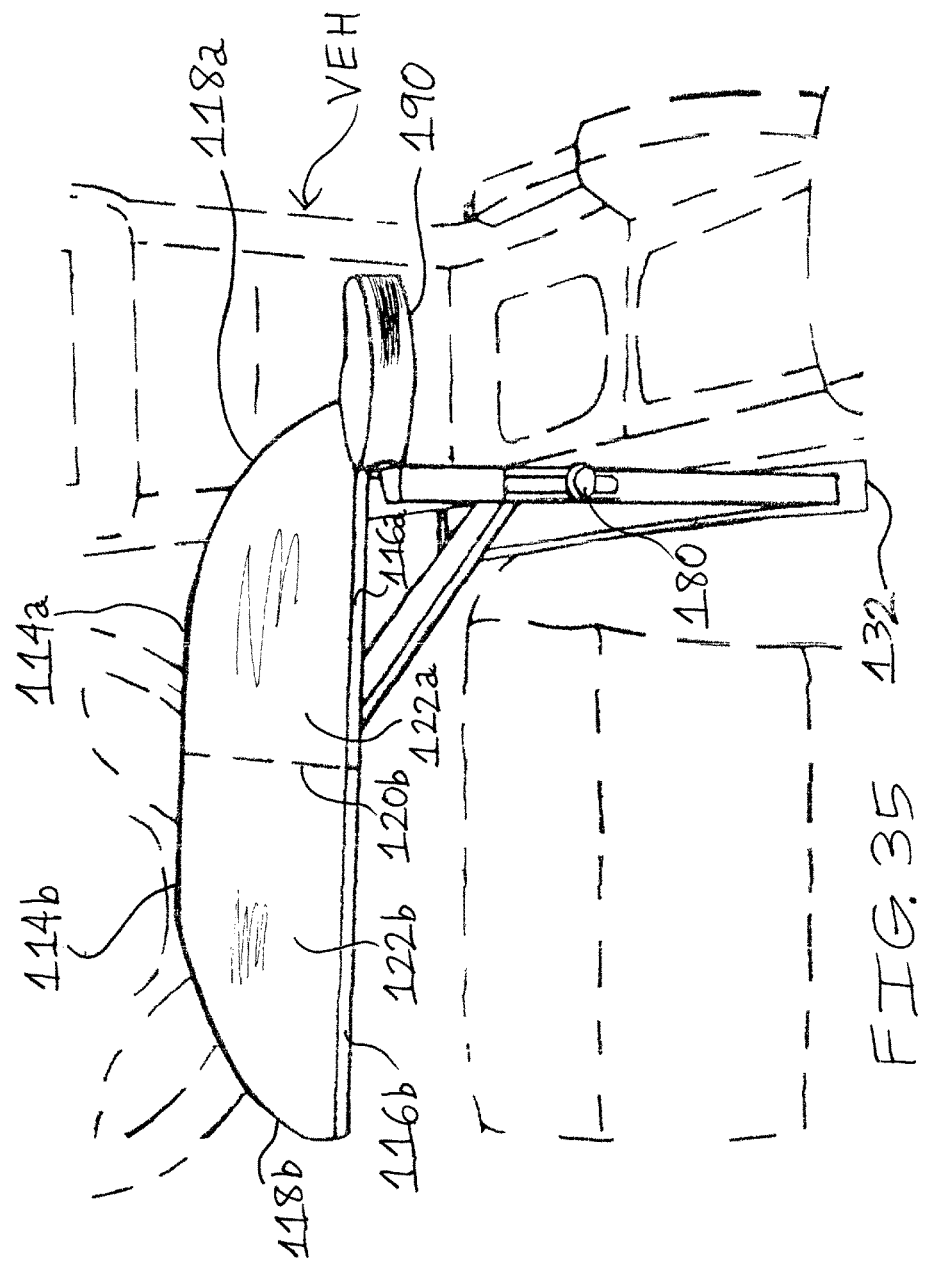
FIG. 35 is an environmental, perspective view of a portable, tray and carrying case apparatus according to the present invention, wherein the apparatus is positioned on the driver side of a vehicle, and wherein a fold-tray tray is unfolded and placed in a working position and a support arm or bar is in an extended position.
Figure 39:
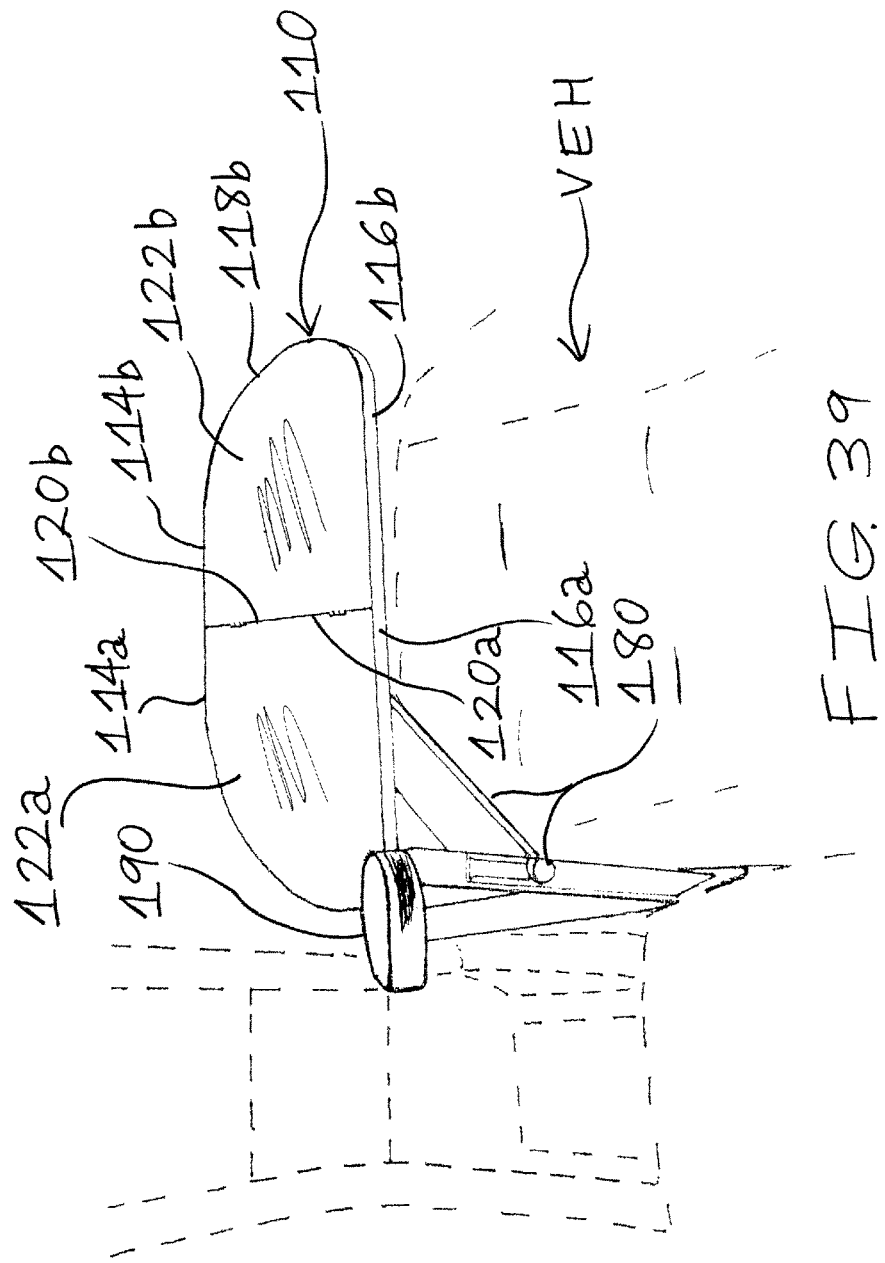
FIG. 39 is an environmental, perspective view of a portable, tray and carrying case apparatus according to the present invention, wherein the apparatus is positioned on the passenger side of a vehicle, and wherein a fold-tray tray is unfolded and placed in a working position and a support arm or bar is in an extended position.

In an embodiment and referring to FIGS. 1-4, the portable, tray and carrying case apparatus 100 includes: a tray 110, preferably a fold-out tray, adapted for being placed in at least a working position WP (as shown in FIGS. 23, 32, 35 and 39) and a stowed position SP (as shown in FIGS. 1-20 and 40-45); a carrying case, container, shell or housing 130 adapted for storing or stowing the tray 110 when the tray 110 is not in use and adapted for being a portable, transporting device for the tray 110 when the tray 110 is not in use and is desired to be transported; a support arm or bar 150 pivotally secured or attached to the carrying case 130 and adapted for being placed in an elevated position EP (as shown in FIGS. 23, 32, 35 and 39) whereby the tray 110 may be placed in the working position WP; a support arm locking member, mechanism or assembly 170 for locking the support arm or bar 150 in the elevated position EP relative to the carrying case 130; a tray locking and support bracket assembly 180 for locking the tray 110 in the working position WP relative to the support arm or bar 150 and for providing support to the tray 110 when the tray 110 is in the working position WP and being used by a user; and a handle 190.

Further, as shown in FIGS. 40 and 41, the portable, tray and carrying case apparatus 100 may be a free-standing apparatus that can stand upright on its own by the way that it is shaped or weighted, such as, but not limited to, the carrying case 130 having a sufficiently-sized bottom or having a sufficient weight, or that can stand upright on its own by the inclusion of an apparatus stabilizing structure 195, such as, but not limited to, apparatus stabilizing legs or extensions.

Figure 24:
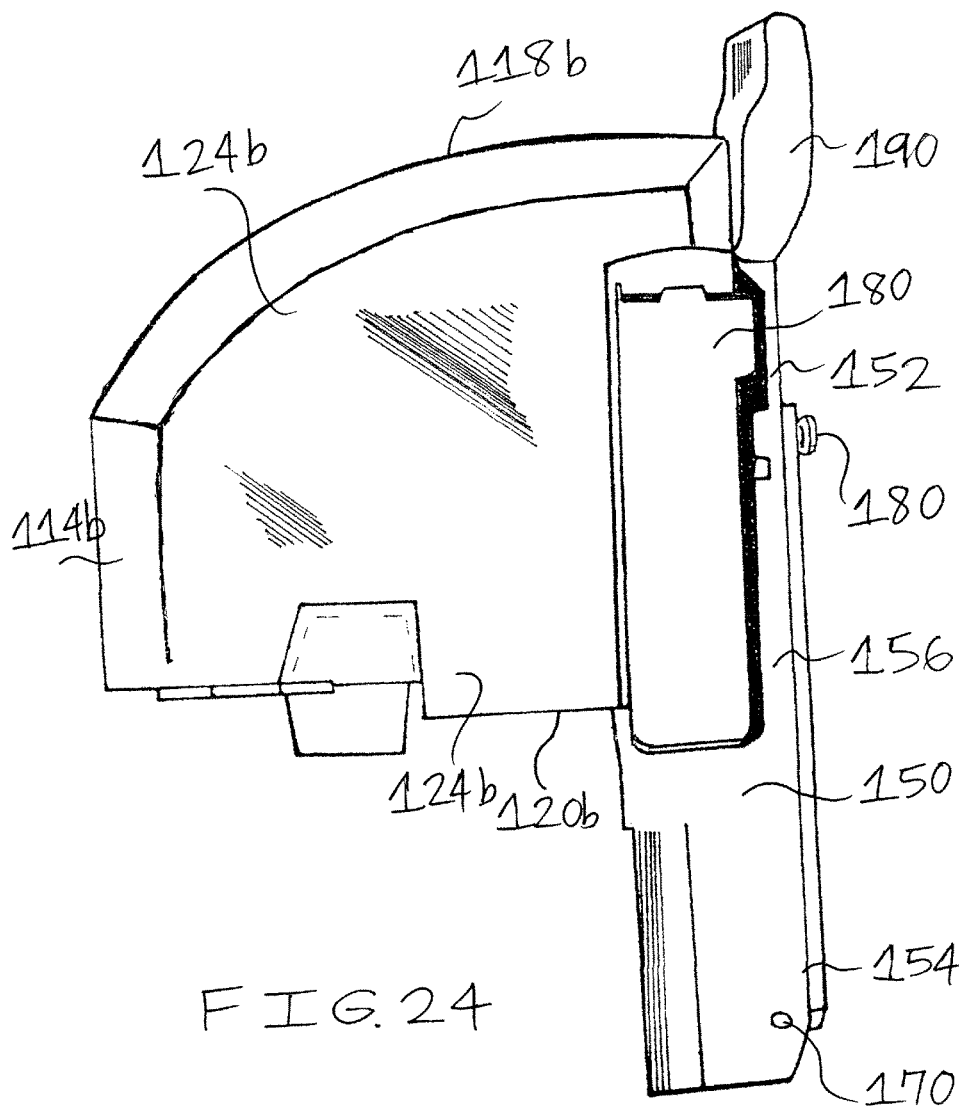
FIG. 24 is a side, perspective assembly view of a fold-out tray, a support arm or bar, and a handle, wherein the fold-out tray is in a folded position.
Figure 34:
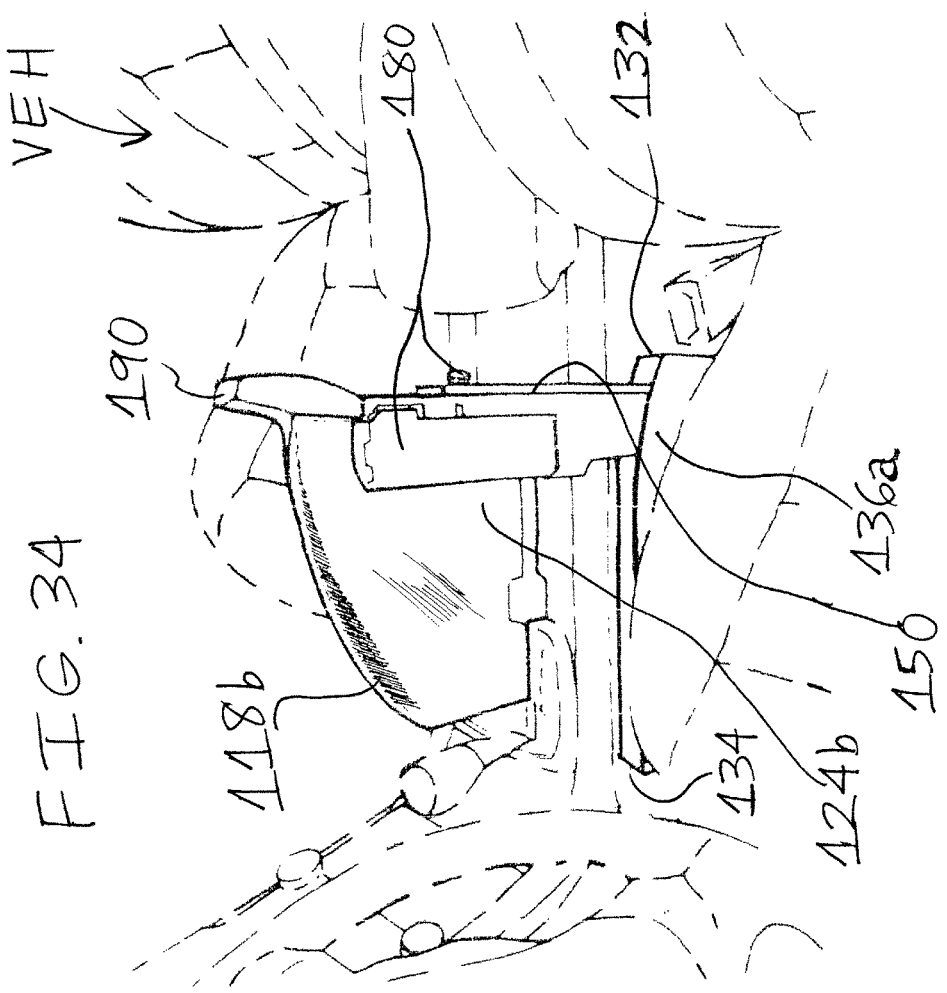
FIG. 34 is an environmental, perspective view of a portable, tray and carrying case apparatus according to the present invention, wherein the apparatus is positioned on the driver side of a vehicle, and wherein a fold-tray tray is folded and has been moved toward a working position and a support arm or bar is in an extended position.
Figure 38:
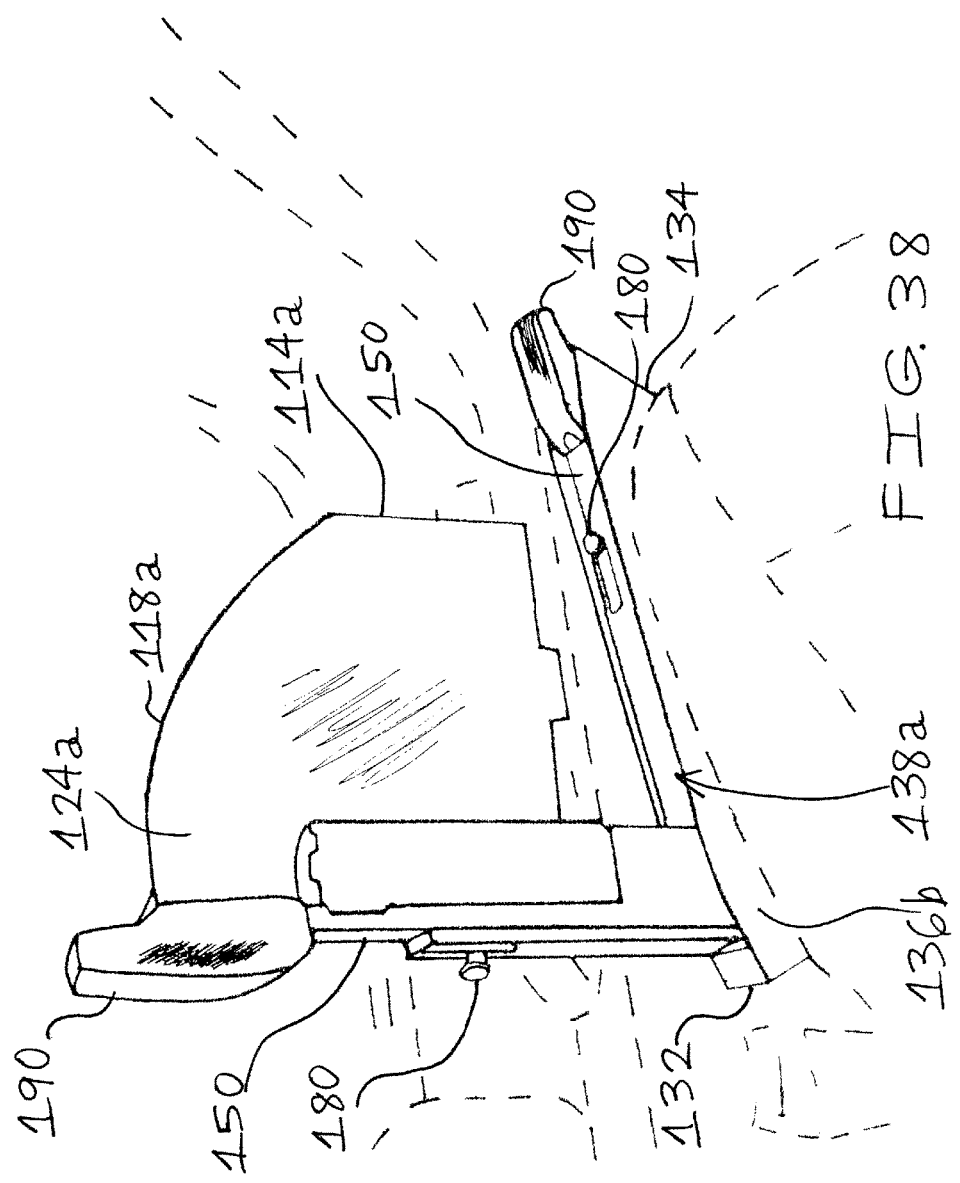
FIG. 38 is an environmental, perspective view of a portable, tray and carrying case apparatus according to the present invention, wherein the apparatus is positioned on the passenger side of a vehicle, and wherein a fold-tray tray is folded and has been moved toward a working position and a support arm or bar is in an extended position.

As best shown in FIGS. 22-24, 29-32, 34, 35, 38 and 39, the tray 110, preferably a fold-out tray, is dimensioned and configured for being stored or stowed inside the carrying case 130 when the tray 110 is not in use. Alternatively, the tray 110 can also be a version of a tray, such as, but not limited to, a one-piece tray, that is not a fold-out tray.

Figure 33:
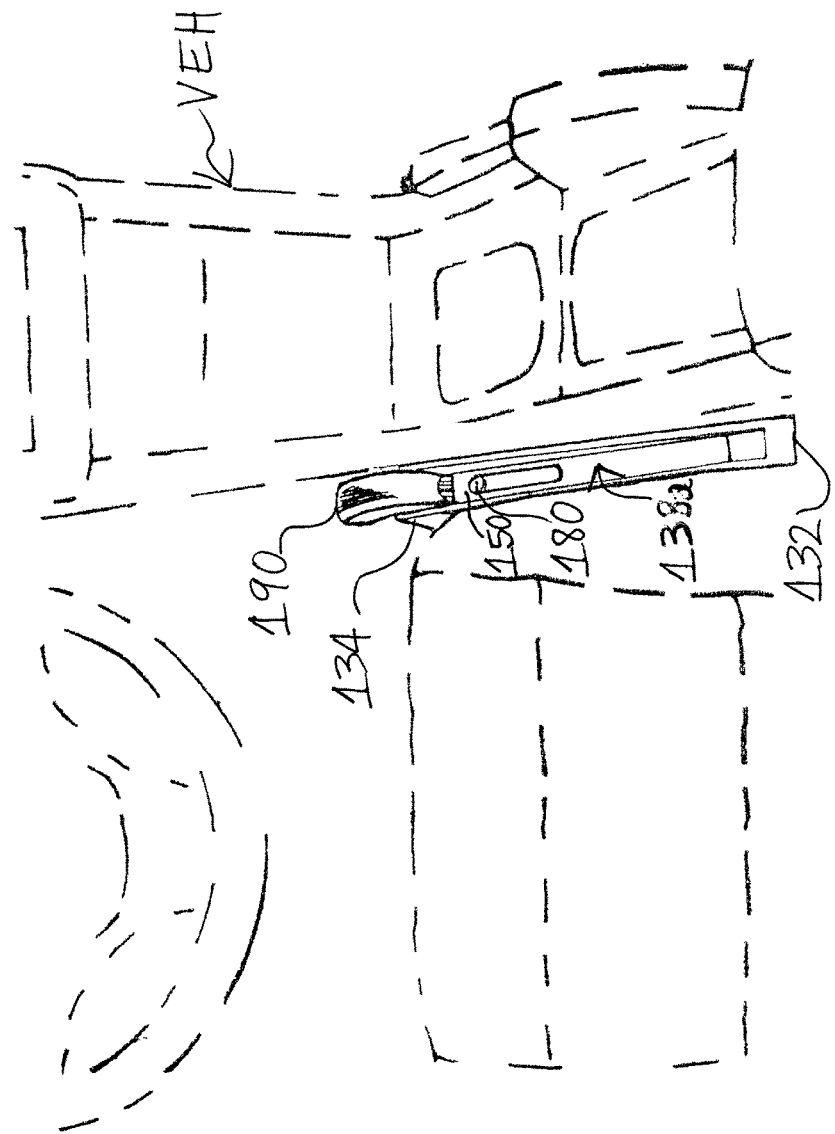
FIG. 33 is an environmental, perspective view of a portable, tray and carrying case apparatus according to the present invention, wherein the apparatus is positioned on the driver side of a vehicle, and wherein a carrying case has an open top and a tray is in a stowed position.
Figure 36:
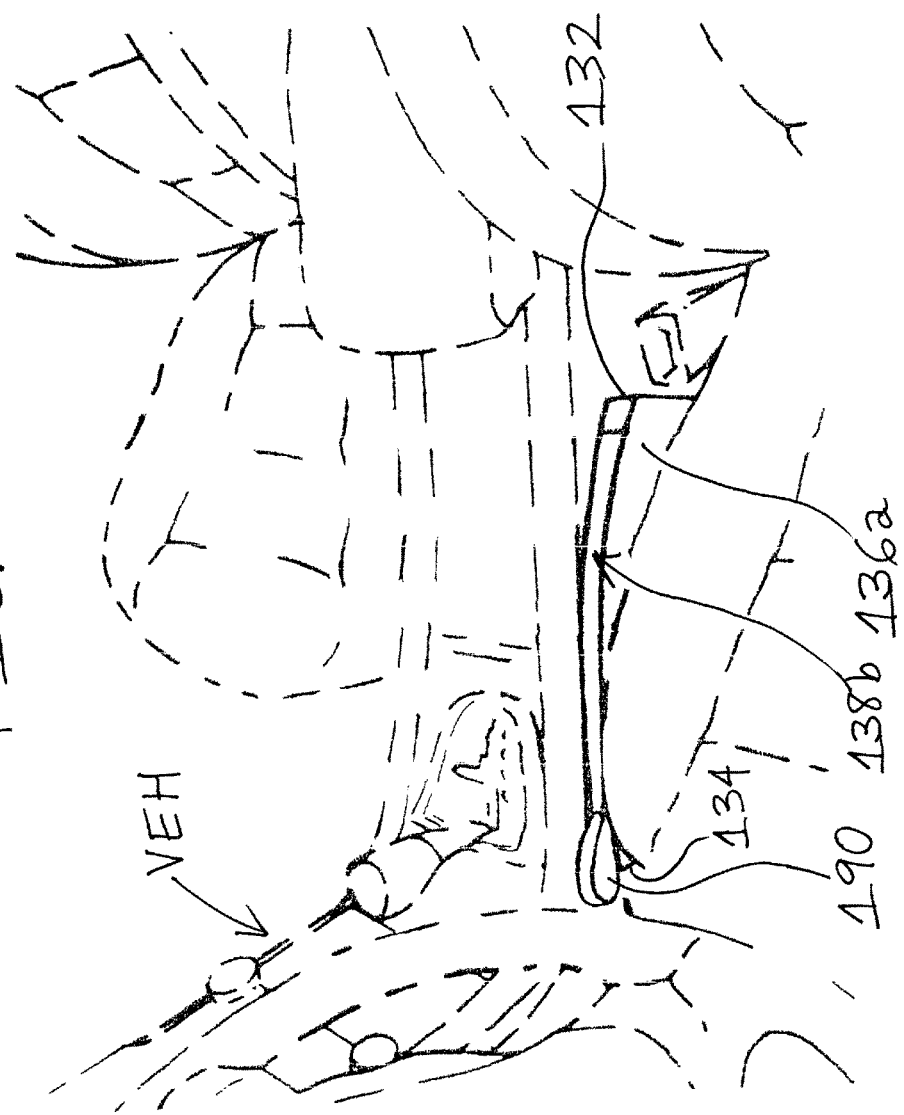
FIG. 36 is an environmental, perspective view of a portable, tray and carrying case apparatus according to the present invention, wherein the apparatus is positioned on the driver side of a vehicle, and wherein a carrying case has a closed top and a tray is in a stowed position.
Figure 37:
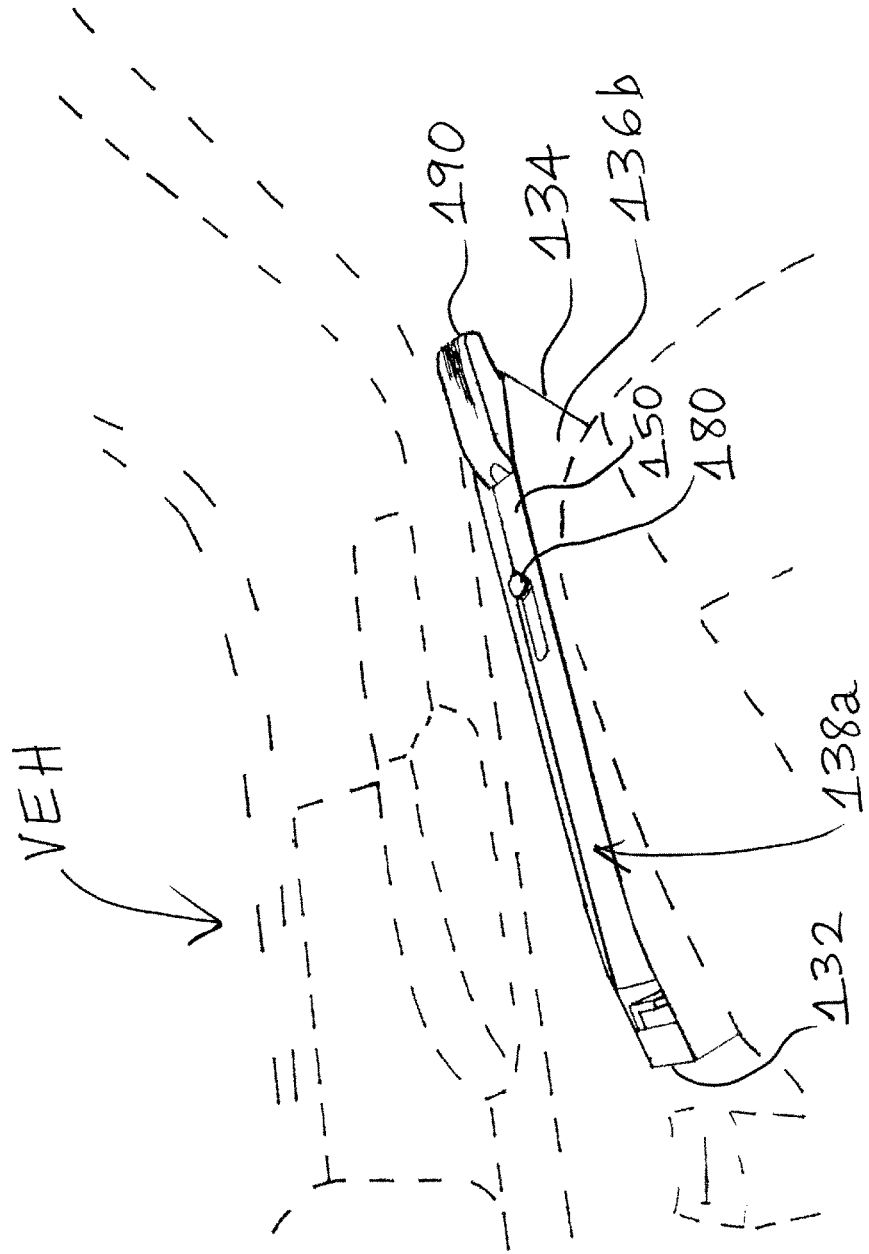
FIG. 37 is an environmental, perspective view of a portable, tray and carrying case apparatus according to the present invention, wherein the apparatus is positioned on the passenger of a vehicle, and wherein a carrying case has an open top and a tray is in a stowed position.

The fold-out tray 110 comprises a first tray section 112a and a second tray section 112b that are hinged or pivotally attached or secured to one another. When the first tray section 112a and second tray section 112b are folded and adjacent to one another and the support arm or bar 150 is in the elevated position EP, the second tray section 112b can be unfolded away from the first tray section 112a to place the fold-out tray 110 in the working position WP (shown in FIGS. 23, 32, 35 and 39). When the fold-out tray 110 is in the working position WP, the second tray section 112b can be folded toward the first tray section 112a in preparation for the the fold-out tray 110 being placed in the stowed position SP by being stowed or stored inside the carrying case 130 (shown in FIGS. 1-20, 33, 36, 37 and 40-45). Each of the first tray section 112a and second tray section 112b respectively comprises a front 114a,114b, a rear 116a,116b, an outer side 118a,118b, an inner side 120a,120b, a top surface 122a,122b, and a bottom surface 124a,124b. The inner sides 120a,120b are adjacent to one another. The fold-out tray 110 is placed in the folded position FP (shown in FIGS. 22-24, 29, 30, 34 and 38) when the fold-out tray 110 is to be stowed, stored or transported inside the carrying case 130.

The tray 110 may be manufactured or made to be usable by the driver, front passenger, and/or rear passengers of a vehicle VEH. The non-limiting version of the fold-out tray 110 shown in the FIGS. and described above and below is manufactured or made for use by the driver, or rear passengers, of a vehicle VEH (which has a steering wheel on the left side of the vehicle VEH) wherein the first tray section 112a is secured to or about the first end 154 of the support arm or bar 150. A non-limiting version of a tray or fold-out tray 110 that is manufactured or made for use by the front passenger, or rear passengers, of the vehicle VEH is where the second tray section 112b is secured to or about the first end 154 of the support arm or bar 150. It should be obvious to one of ordinary skill in the art that the fold-out tray 110 or version of a tray that is not a fold-out tray can also be manufactured or made to be usable by any of the driver, front passenger, and rear passengers of a vehicle VEH.

As best shown in FIGS. 1-20 and 40-45, the carrying case, container, shell or housing 130 comprises a front 132, a rear 134, a pair of opposing sidewalls 136a,136b, a top 138a (open top), 138b (closed or substantially-closed top), a bottom 140, and a receiving chamber 142 defined by the front 132, rear 134, pair of opposing sidewalls 136a,136b, top 138a, 138b, and bottom 140. The receiving chamber 142 is dimensioned and configured for receiving the tray 110. The carrying case 130 is adapted for storing or stowing the tray 110 when the tray 110 is not in use.

Preferably, the top of the carrying case 130 is an open top 138a (shown in FIGS. 1-10 and 40-43) so that the fold-out tray 110 can be quickly and easily accessed and placed in the working position WP from the stowed position SP, and vice versa. Alternatively, the top may be a closed top 138b, fully-closed top or substantially-closed top (shown in FIGS. 11-20 and 44-45), so as to provide extra protection and/or security for the fold-out tray 110 and other components 150,170,180 to keep the components 150,170,180 inside the carrying case 130 clean and/or to minimize or prevent damage, such as from the apparatus 100 being dropped, from weather elements, such as rain, or from fluid spills and things getting into the carrying case 130 and/or onto the components 150,170,180 of the apparatus 100. A closed top 138b may also be desired so that the apparatus 100 can have a nice or styish appearance, such as, but not limited to, of a briefcase and the like, where the fold-out tray 110 and other components 150,170,180 are hidden and cannot be seen until the closed top 138b is partially or fully opened.

Preferably, the bottom 140 of the carrying case 130 is a closed bottom 140 so as to provide extra protection and/or security for the fold-out tray 110 and other components 150,170,180.

Preferably, as best shown in FIGS. 33-39, the carrying case 130 is dimensioned and configured for being positioned between the center console and either front seats of a vehicle VEH. Alternatively, the carrying case 130 may be dimensioned and configured in various sizes and shapes to allow the apparatus 100 to be usable in various indoor and outdoor environments and settings, but still be portable. In addition to providing compact storage and protection for the tray 110 and other components 150,170,180,190,195, the carrying case 130 functions as a portable, carrying device for a user to carry or transport the tray 110 and other components 150,170,180,190,195. As a non-limiting example, the carrying case 130, or exterior of the carrying case 130, may be made or manufactured of leather, vinyl, plastic, metal, steel, any material known to one of ordinary skill in the art, and any combination thereof.

Figures 25, 26:
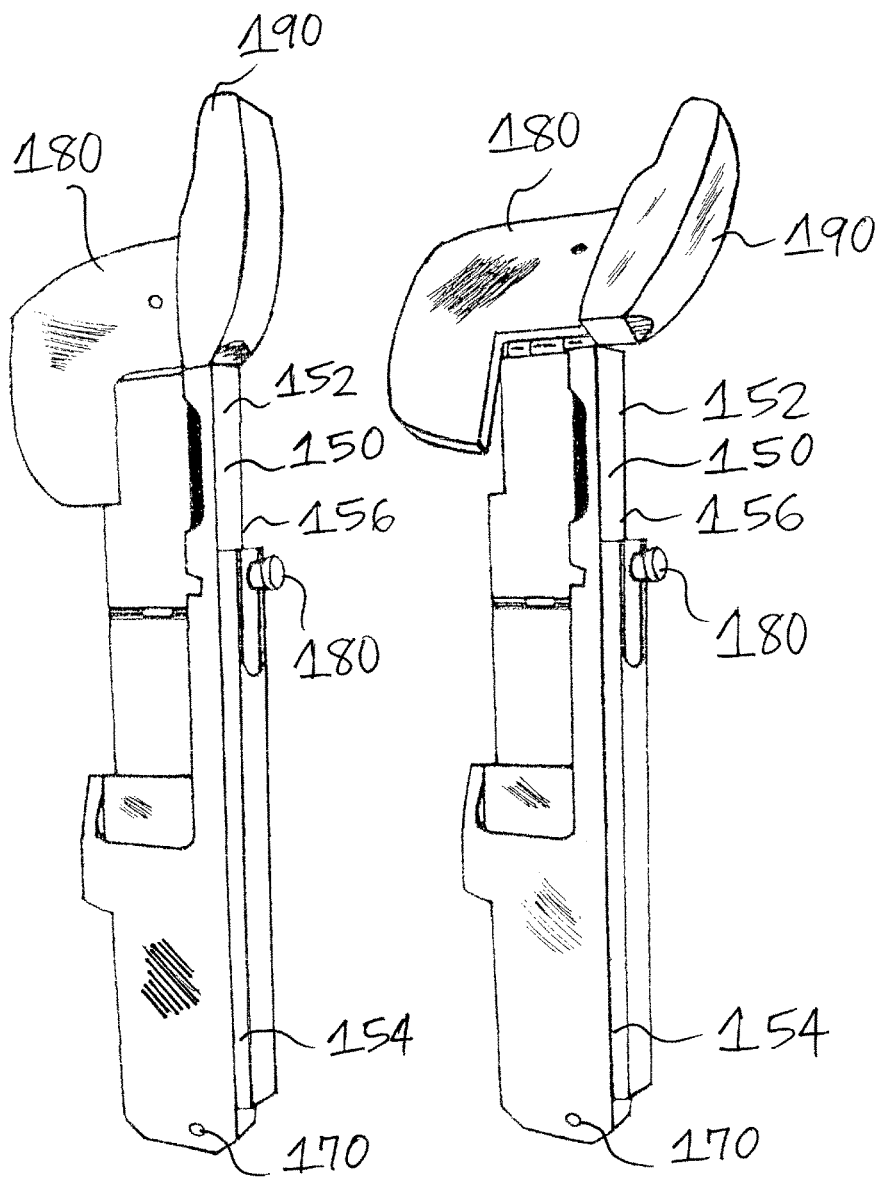
FIG. 25 is a right side, perspective assembly view of a support arm or bar, a tray locking and support bracket assembly, and a handle, wherein the handle is in a first position.
FIG. 26 is a right side, perspective assembly view of a support arm or bar, a tray locking and support bracket assembly, and a handle, wherein the handle is in a second position.

As best shown in FIGS. 21-32, 34, 35, 38 and 39, the support arm 150 comprises a first end 152, a second end 154, and an elongated body 156 extending from the first end 152 to the second end 154. The first end 152 is secured to or about the tray 110, while the second end 154 is pivotally secured to the pair of opposing sidewalls 136a,136b of the carrying case 130 at about the rear 134 and top 138a,138b. The support arm 150 is adapted for being placed in an elevated position EP whereby the tray 110 may be placed in the working position WP and being placed in a lowered position LP whereby the tray 110 may be placed in the stowed position SP.

As best shown in FIGS. 21, 22 and 24-28, the support arm locking member, mechanism or assembly 170 is in operative communication with the support arm or bar 150, and is used or activated by the user to lock the support arm or bar 150 in the elevated position EP relative to the carrying case 130.

As best shown in FIGS. 21-32, 34, 35, 38 and 39, the tray locking and support bracket assembly 180 locks the fold-out tray 110 in the working position WP relative to the support arm or bar 150, and provides support to the fold-out tray 110 when the fold-out tray 110 is in the working position WP and being used by a user.

As best shown in FIGS. 1-20 and 22-4, the handle 190 is preferably secured to or about the first end 154 of the support arm or bar 150, and also to the tray locking and support bracket assembly 180 about the rear 116a and outer side 118a of the first tray section 112a.

As best shown in FIGS. 40 and 41, the apparatus stabilizing structure 195, such as, but not limited to, apparatus stabilizing legs or extensions, acts as a stabilizer for the apparatus 100, and may be of a version that may be moved from a folded position to an extended position such that the apparatus stabilizing legs or extensions 195 stabilizes the apparatus 100 relative to the environment or setting, such as, but not limited to, the ground.

For use or operation of the apparatus 100: a user may use the handle 190 to move, lift or pivot the support arm or bar 150 upwardly away from the receiving chamber 142 of the carrying case 130 such that the support arm or bar 150 is moved from the lowered position LP toward or to the elevated position EP and that the fold-out tray 110 is moved from the stowed position SP toward the working position WP whereby the user can then lock the support arm or bar 150 in position relative to the carrying case 130 via the use of the support arm locking member, mechanism or assembly 170 and lock the fold-out tray 110 in position relative to the support arm or bar 150 via the use of the tray locking and support bracket assembly 180, and, further, can then unfold or move the first tray section 112a and second tray section 112b away from one another and then into the working position. When a user uses the handle 190 to move or pivot the support arm or bar 150 downwardly toward the receiving chamber 142 of the carrying case 130 such that the support arm or bar 150 is moved from the elevated position EP to the lowered position LP after having folded or moved the first tray section 112a and second tray section 112b toward one another and having unlocked the fold-out tray 110 relative to the support arm or bar 150 via the use of the tray locking and support bracket assembly 180, the fold-out tray 110 is moved from the working position WP toward and/or into the stowed position SP.

Each of the components 110,150,170,180,190,195 of the apparatus 100 may be made or manufactured of any material or combination of materials, such as, but not limited to, steel, metal, plastic, any material known to one of ordinary skill in the art, and any combination thereof. Preferably, each of the components 110,150,170,180,190,195 of the apparatus 100 is made or manufactured of a lightweight material or combination of lightweight materials.

It is to be understood that the present invention is not limited to the embodiments described above or as shown in the attached figures, but encompasses any and all embodiments within the spirit of the invention.

What is claimed is:

1. A portable, tray and carrying case apparatus comprising:
   a retractable tray adapted for being alternatively placed in at least a tray working position and a tray stowed position, wherein said retractable tray is adapted for being retracted into said tray stowed position from said tray working position, and wherein said retractable tray is adapted for being elevated upward from said tray stowed position to said tray working position such that a user is able to perform work on said retractable tray;
   a carrying case comprising a front, a rear, and a pair of sidewalls, and a tray-receiving chamber defined by said front, said rear, and said pair of sidewalls, wherein said tray-receiving chamber is dimensioned and configured for receiving and stowing at least a substantial portion of said retractable tray when said retractable tray is not in use and is placed in said stowed position, and wherein said carrying case is adapted for being a portable, transporting device for said retractable tray when said retractable tray is not in use, is in said tray stowed position, and is desired to be transported;
   a vertical support arm or bar comprising a first end, a second end, and an elongated body extending from said first end toward said second end, wherein said vertical support arm or bar is secured about said retractable tray, wherein said vertical support arm or bar is adapted for being alternatively placed in at least an arm elevated position and an arm stowed position, wherein said vertical support arm or bar is adapted for being retracted into said arm stowed position from said arm elevated position, and wherein said vertical support arm or bar is adapted for being elevated upward from said arm stowed position to said arm elevated position such that said retractable tray is able to be placed in said tray working position so that the user is able to perform work on said retractable tray; and
   a support arm locking mechanism for locking said vertical support arm or bar in said arm elevated position.

2. The portable, tray and carrying case apparatus according to claim 1, wherein said retractable tray is a fold-out, retractable tray comprising a pair of tray halves and at least one tray hinge secured to said pair of tray halves at a predetermined position, wherein said pair of tray halves are adapted for being placed in a folded position by said at least one tray hinge such that said pair of tray halves are in close proximity of one another when said fold-out, retractable tray is in said tray stowed position and being placed in an unfolded position by said at least one tray hinge such that said pair of tray halves form a full tray when said fold-out, retractable tray is in said tray working position.

3. The portable, tray and carrying case apparatus according to claim 1, wherein said top of said carrying case is an open top.

4. The portable, tray and carrying case apparatus according to claim 1, wherein said top of said carrying case is a closed top.

5. The portable, tray and carrying case apparatus according to claim 1, wherein said carrying case is of sufficient weight whereby said apparatus can stand upright on its own when said retractable tray is in use.

6. The portable, tray and carrying case apparatus according to claim 1, wherein said support arm or bar is pivotally secured to said carrying case.

7. The portable, tray and carrying case apparatus according to claim 1, further comprising a handle secured about said a support arm or bar such that said handle is adapted to move said support arm or bar to said arm elevated position whereby said retractable tray may be placed in said tray working position.

8. The portable, tray and carrying case apparatus according to claim 1, further comprising an apparatus stabilizing structure to allow said apparatus to be a free-standing apparatus that can stand upright on its own.

9. The portable, tray and carrying case apparatus according to claim 8, wherein said apparatus stabilizing structure is a plurality of apparatus stabilizing legs.

10. The portable, tray and carrying case apparatus according to claim 1, wherein said carrying case further comprises a bottom.

11. The portable, tray and carrying case apparatus according to claim 10, wherein said bottom is of sufficient size whereby said apparatus can stand upright on its own when said retractable tray is in use.

12. The portable, tray and carrying case apparatus according to claim 1, further comprising a tray locking and support bracket assembly for locking said retractable tray in said tray working position and for providing support to said retractable tray when said retractable tray is in said tray working position and being used by a user.

13. The portable, tray and carrying case apparatus according to claim 1, wherein said portable, tray and carrying case apparatus is dimensioned and configured such that said apparatus has an overall visual appearance of a briefcase when said retractable tray and said support arm or bar are both in said stowed position.

14. The portable, tray and carrying case apparatus according to claim 1, wherein said portable, tray and carrying case apparatus is dimensioned and configured for being positioned for use in an upright position within a slot area located between and adjacent one of two front seats of an automobile and a center console that separates the two front seats of the automobile.

15. The portable, tray and carrying case apparatus according to claim 1, wherein said carrying case has a wedge configuration.

16. The portable, tray and carrying case apparatus according to claim 1, wherein said vertical support arm or bar is adapted for being elevated upward into a generally vertical position from said arm stowed position to said arm elevated position.

17. A portable, tray and carrying case apparatus comprising:
a fold-out, retractable tray adapted for being alternatively placed in at least a tray working position and a tray stowed position, wherein said fold-out, retractable tray is adapted for being retracted into said tray stowed position from said tray working position, wherein said fold-out, retractable tray is adapted for being elevated upward from said tray stowed position to said tray working position such that a user is able to perform work on said retractable tray, wherein said fold-out, retractable tray comprises a pair of tray halves and at least one tray hinge secured to said pair of tray halves at a predetermined position, wherein said pair of tray halves are adapted for being placed in a folded position by said at least one tray hinge such that said pair of tray halves are in close proximity of one another when said fold-out, retractable tray is in said tray stowed position and being placed in an unfolded position by said at least one tray hinge such that said pair of tray halves form a full tray when said fold-out, retractable tray is in said tray working position;
a carrying case comprising a front, a rear, a pair of sidewalls, and a tray-receiving chamber defined by said front, said rear, and said pair of sidewalls, wherein said tray-receiving chamber is dimensioned and configured for receiving and stowing at least a substantial portion of said fold-out, retractable tray when said fold-out, retractable tray is not in use and is placed in said tray stowed position, and wherein said carrying case is adapted for being a portable, transporting device for said fold-out, retractable tray when said fold-out, retractable tray is not in use, is in said tray stowed position, and is desired to be transported;
a vertical support arm or bar comprising a first end, a second end, and an elongated body extending from said first end toward said second end, wherein said vertical support arm or bar is secured about said fold-out, retractable tray, wherein said vertical support arm or bar is adapted for being alternatively placed in at least an arm elevated position and an arm stowed position, wherein said vertical support arm or bar is adapted for being retracted into said arm stowed position from said arm elevated position, and wherein said vertical support arm or bar is adapted for being elevated upward from said arm stowed position to said arm elevated position such that said fold-out, retractable tray is able to be placed in said tray working position so that the user is able to perform work on said retractable tray; and
a support arm locking mechanism for locking said vertical support arm or bar in said arm elevated position.

18. The portable, tray and carrying case apparatus according to claim 17, wherein said top of said carrying case is an open top.

19. The portable, tray and carrying case apparatus according to claim 17, wherein said top of said carrying case is a closed top.

20. The portable, tray and carrying case apparatus according to claim 17, wherein said carrying case is of sufficient weight whereby said apparatus can stand upright on its own when said fold-out, retractable tray is in use.

21. The portable, tray and carrying case apparatus according to claim 17, further comprising a handle secured about said a support arm or bar such that said handle is adapted to move said support arm or bar to said arm elevated position whereby said fold-out, retractable tray may be placed in said tray working position and to move said support arm or bar to said arm stowed position whereby said fold-out, retractable tray may be placed in said tray stowed position.

22. The portable, tray and carrying case apparatus according to claim 17, further comprising an apparatus stabilizing structure to allow said apparatus to be a free-standing apparatus that can stand upright on its own.

23. The portable, tray and carrying case apparatus according to claim 22, wherein said apparatus stabilizing structure is a plurality of apparatus stabilizing legs.

24. The portable, tray and carrying case apparatus according to claim 17, wherein said carrying case further comprises a bottom.

25. The portable, tray and carrying case apparatus according to claim 24, wherein said bottom is of sufficient size whereby said apparatus can stand upright on its own when said retractable tray is in use.

26. The portable, tray and carrying case apparatus according to claim 17, further comprising a tray locking and support bracket assembly for locking said retractable tray in said tray working position and for providing support to said retractable tray when said retractable tray is in said tray working position and being used by a user.

27. The portable, tray and carrying case apparatus according to claim 17, wherein said portable, tray and carrying case apparatus is dimensioned and configured such that said apparatus has an overall visual appearance of a briefcase when said retractable tray and said support arm or bar are both in said stowed position.

28. The portable, tray and carrying case apparatus according to claim 17, wherein said portable, tray and carrying case apparatus is dimensioned and configured for being positioned for use in an upright position within a slot area located between and adjacent one of two front seats of an automobile and a center console that separates the two front seats of the automobile.

29. The portable, tray and carrying case apparatus according to claim 17, wherein said carrying case has a wedge configuration.

30. The portable, tray and carrying case apparatus according to claim 17, wherein said vertical support arm or bar is adapted for being elevated upward into a generally vertical position from said arm stowed position to said arm elevated position.

\* \* \* \* \*